(12) United States Patent
Kotra et al.

(10) Patent No.: US 11,481,331 B2
(45) Date of Patent: Oct. 25, 2022

(54) PROMOTING PREFETCHED DATA FROM A CACHE MEMORY TO REGISTERS IN A PROCESSOR

(71) Applicant: Advanced Micro Devices, Inc., Santa Clara, CA (US)

(72) Inventors: Jagadish Kotra, Austin, TX (US); John Kalamatianos, Arlington, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 75 days.

(21) Appl. No.: 17/135,832

(22) Filed: Dec. 28, 2020

(65) Prior Publication Data

US 2022/0100665 A1 Mar. 31, 2022

Related U.S. Application Data

(60) Provisional application No. 63/083,996, filed on Sep. 27, 2020.

(51) Int. Cl.
*G06F 12/0862* (2016.01)

(52) U.S. Cl.
CPC .... *G06F 12/0862* (2013.01); *G06F 2212/602* (2013.01)

(58) Field of Classification Search
CPC .................................................. G06F 12/0862
USPC ......................................................... 711/118
See application file for complete search history.

(56) References Cited

U.S. PATENT DOCUMENTS

2003/0005237 A1* 1/2003 Dhong .................. G06F 12/084
　　　　　　　　　　　　　　　　　　　　　711/146
2003/0236966 A1* 12/2003 Samra ................. G06F 9/30181
　　　　　　　　　　　　　　　　　　　　　712/209

OTHER PUBLICATIONS

Value Locality and Load Value Prediction, Mikko Lipasti, Chris Wilkerson and John Paul Shen, ASPLOS'96, 1996.
Speculative Execution via Address Prediction and Data Prefetching, J. Gonzalez and A. Gonzale, SC'97, 1997.
Correlated Load-address Predictors, Michael Bekerman, Stephan Jourdan, Ronny Ronen, Gilad Kirshenboim, Lihu Rappoport, Adi Yoaz, and Uri Weiser, ISCA'99, 1999.
Load value prediction via path-based address prediction: Avoiding mispredictions due to conflicting stores, Rami Sheikh, H. Cain, and R. Damodaram, MICRO'2017, 2017.
Memory Renaming: Fast, Early and Accurate Processing of Memory Communication, Gary Tyson and Todd Austin, JILP'99,1999.

(Continued)

*Primary Examiner* — Jae U Yu
(74) *Attorney, Agent, or Firm* — Park, Vaughan, Fleming & Dowler LLP

(57) ABSTRACT

An electronic device includes a processor having a cache memory, a plurality of physical registers, and a promotion logic functional block. The promotion logic functional block promotes prefetched data from a portion of a cache block in the cache memory into a given physical register, the promoting including storing the prefetched data in the given physical register. Upon encountering a load micro-operation that loads data from the portion of the cache block into a destination physical register, the promotion logic functional block sets the processor so that the prefetched data stored in the given physical register is provided to micro-operations that depend on the load micro-operation.

26 Claims, 15 Drawing Sheets

(56) References Cited

OTHER PUBLICATIONS

Architectural support for unlimited memory versioning and renaming, Eran Gilad, Tehila Mayzels, Elazar Raab, Mark Oskin, and Yoav Etsion, IPDPS'2018, 2018.

Focusing processor policies via critical-path prediction, Brian A. Fields, Shai Rubin, and R. Bodik, ISCA'2001, 2001.

Criticality Aware Tiered Cache Hierarchy: A Fundamental Relook at Multi-Level Cache Hierarchies, Ananth V. Nori, Jayesh Gaur, Siddharth Rai, and S. Subramoney. ISCA'2019, 2019.

Domain-Specialized Cache Management for Graph Analytics, P. Faldu, Jeff Diamond, and Boris Grot, PACT'2019, 2019.

Analysis and Optimization of the Memory Hierarchy for Graph Processing Workloads, A. Basak, Shuangchen Li et al. HPCA'2019, 2019.

* cited by examiner

PROMOTING PREFETCHED DATA FROM A CACHE MEMORY TO REGISTERS IN A PROCESSOR

RELATED APPLICATIONS

This application claims priority to U.S. provisional application No. 63/083,996, which was filed on 27 Sep. 2020, and which is incorporated by reference herein.

GOVERNMENT RIGHTS

This invention was made with government support under the PathForward Project with Lawrence Livermore National Laboratory (prime contract no. DE-AC52-07NA27344, subcontract no. B620717) awarded by the Department of Energy (DOE). The government has certain rights in this invention.

BACKGROUND

Related Art

In some electronic devices, processors execute program code instructions that cause the processor to perform operations for software entities such as operating systems, applications, and firmware. In some of these processors, program code instructions, which can be called macro-instructions, are decoded into micro-operations for execution. Generally, a micro-operation is a low-level processor instruction that, when executed by the processor, causes the processor to perform a respective part of the operation(s) of the macro-instruction from which that micro-operation was decoded. One common form of micro-operation is a load micro-operation, which loads data from a memory subsystem in an electronic device into processor registers. For example, load micro-operations can load operands, control values, address values, etc. from a first-level cache memory in the memory subsystem into processor registers to be used for executing dependent micro-operations (which may require the data to be fetched into the first-level cache memory from elsewhere in the memory subsystem).

In some processors, micro-operations that depend on/use the data loaded by load micro-operations are held in reservation stations in scheduler functional blocks to await the provision of data by load micro-operations. The scheduler functional blocks then allow the dependent micro-operations to proceed to execution, or "wake" the dependent micro-operations, when the load micro-operations have provided the data. Because the dependent micro-operations are held in the scheduler functional blocks awaiting the data, the delay, or "load-use latency," between when a load micro-operation commences preparation for execution and when the scheduler functional block can wake the dependent micro-operations is an important concern.

FIG. 1 presents a timeline diagram illustrating an example of a load-use latency as seen in some processors. For the example in FIG. 1, time, and thus the timeline, runs from left to right. Also, for the example in FIG. 1, a number of functional block labels, i.e., rename, scheduler, etc., are shown in order to provide an illustration of functional blocks in these processors in which operations may occur.

Prior to the operations shown in FIG. 1, a front end of the processor fetches a program code macro-instruction from a first level cache memory, or L1 instruction cache memory, or a memory subsystem in the processor (e.g., a lower level cache, main memory, or storage device) and decodes the macro-instruction into a load micro-operation (and possibly other micro-operations). The front end of the processor then dispatches the load micro-operation to a back end of the processor, as shown via the label DISPATCH.

In the back end of the processor, a rename functional block assigns physical registers to the load micro-operation. The rename functional block then forwards the load micro-operation to a scheduler functional block to be finally prepared for execution. In the scheduler functional block, picker logic generates a virtual address from which the load micro-operation is to load data, as shown via the label PICK (VA GEN). The picker logic then translates the virtual address into a physical address, as shown via the label PICK (PA GEN). The picker logic then forwards the load micro-operation with the physical address to a load/store execution unit for execution.

The load/store unit, upon executing the load micro-operation, acquires/reads the data to be loaded from a first level data cache memory, or L1 data cache memory, as shown via the corresponding label in FIG. 1 (the data is assumed to be present in the L1 data cache memory). The load/store unit then stores the acquired data in a destination physical register (i.e., register circuitry in the processor) for the load micro-operation. In addition, the load/store unit provides/broadcasts the data to the schedulers to enable the schedulers to wake dependent micro-operations that are held in the reservation station, as shown via the corresponding label in FIG. 1. When the address generation, the L1 data cache memory access, and the loading of the data to the destination physical register are completed, the load completes, as shown via the label LOAD COMPLETION. The load/store unit then performs one or more consistency checks to ensure that the load micro-operation executed without violating the processor's memory ordering model, as shown via the label CONSISTENCY CHECKS (it is assumed that the load micro-operation executed without any memory ordering violations). The load/store unit then forwards the completed load micro-operation to a retire unit where the load micro-operation is eventually retired, as shown via the label RETIRE.

Upon receiving the broadcasted data from the load/store unit, the schedulers wake the dependent micro-operations, as shown via the label PICK DEPENDENT UOP. The schedulers then commence finally preparing the dependent micro-operations for execution, which includes providing the data to the dependent micro-operations. As shown by the label LOAD-USE LATENCY, the load-use latency consists of the delay between the scheduler picking the load micro-op (i.e., to generate the load micro-operation's virtual addresses) and the waking of dependent micro-operations.

BRIEF DESCRIPTION OF THE FIGURES

Throughout the figures and the description, like reference numerals refer to the same figure elements.

DETAILED DESCRIPTION

Figure 1:
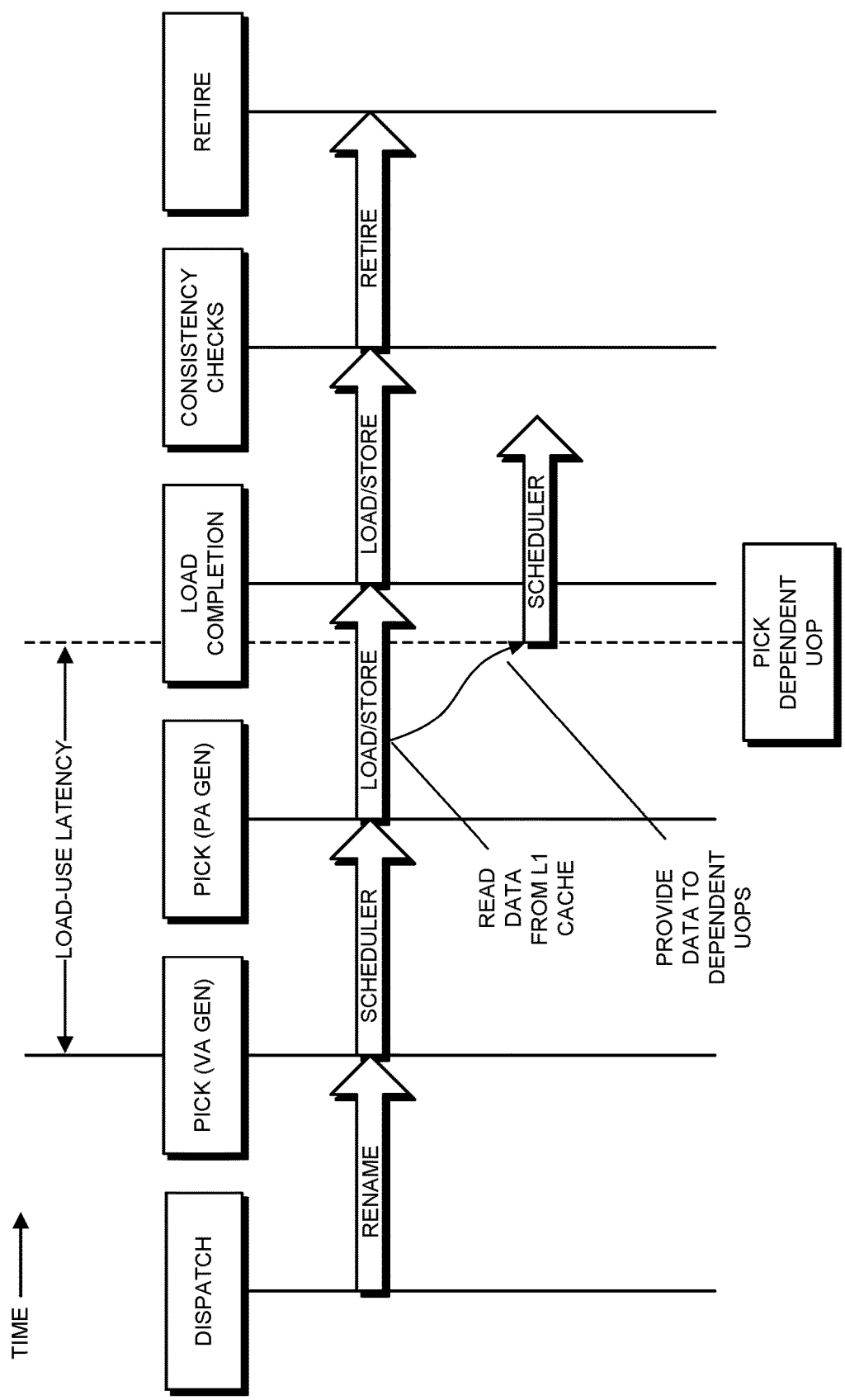
FIG. 1 presents a timeline diagram illustrating a load-use latency as seen in some processors.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of one of the terms. Note that this term may have significant additional aspects that are not recited herein for clarity and brevity and thus the description is not intended to limit this term.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Instructions and Micro-Operations

In the described embodiments, a processor executes instructions from program code such as applications, operating systems, firmware, etc. that cause the processor to perform corresponding operations. Before executing some or all of the instructions, which can be called "macro-instructions," the processor decodes the instructions into "micro-operations" (or "µtops" or "uops") that are executed by the processor. Each micro-operation is a low-level processor instruction that, when executed by the processor, causes the processor to perform a respective part of the operation(s) of the instruction from which the micro-operation was decoded. For example, an ADD instruction can be decoded into a number of micro-operations such as, for the instruction ADD [MEMADDR], EBX, EAX:

LOAD EBX, [MEMADDR];
ADD EBX, EAX; and
LOAD EBX, [MEMADDR].

In this example, the first LOAD micro-operation loads data at memory address MEMADDR from memory into a processer register, i.e., the EBX register. The ADD micro-operation then adds the data/value in the EAX register to the data/value in the EBX register. The second LOAD micro-operation stores the data in the EBX register to the memory address MEMADDR, thereby storing the sum in memory.

Virtual Memory

The described embodiments use a "virtual memory" technique for handling data accesses by software entities and/or hardware functional blocks. In the described embodiments, when data is accessed by a software entity and/or a hardware functional block, a block of memory of a given size (e.g., 4 kB, 64 kB, etc.) that includes the data, which is called a "page" of memory, is copied from a storage device to an available physical location in a memory in an electronic device or newly created at a physical location in the memory. In order to avoid software entities and/or hardware functional blocks being required to keep track of the physical locations of pages in memory, processors (e.g., memory management units therein) keep track of the physical locations of the pages for the software entities and/or hardware functional blocks. In these embodiments, software entities and/or hardware functional blocks address memory using "virtual addresses" in "virtual address spaces," which are address spaces that are specific to corresponding software entities and/or hardware functional blocks, instead of addressing memory using addresses based on the physical locations of pages (or "physical addresses"). From a software entity's and/or hardware functional block's perspective, virtual addresses indicate the locations where data is stored within the pages in memory and memory accesses are made using the virtual addresses accordingly. The virtual addresses, however, may not map directly to the physical addresses of the physical locations where data is stored in pages in the memory. As part of managing the physical locations of pages, processors translate the virtual addresses used by the software entities and/or hardware functional blocks in memory access requests into the physical addresses where the data is actually located. The processors then use the translated physical addresses to perform memory accesses.

In order to enable the above-described virtual address to physical address translation, the described embodiments include a "page table." The page table is a record stored in a memory of the electronic device that includes an entry, or a "page table entry," with virtual address to physical address translation information for pages that are stored in the memory. Upon receiving a request from a software entity and/or a hardware functional block to access memory at a virtual address, the processor acquires corresponding physical address information from the page table by performing a "page table walk," during which the page table in memory is searched for a page table entry that provides the physical address associated with the virtual address.

Because page table walks are relatively slow, it is desirable to avoid performing page table walks. The described embodiments therefore include translation lookaside buffers ("TLBs"), which are local caches in, or associated with, processors that are used for storing a limited number of copies of information based on page table entries that were acquired during page table walks. When performing virtual address to physical address translations, the processors first perform a lookup in the corresponding TLB in an attempt to acquire cached page table entry information from the corresponding TLB. When the page table entry information is not present in the corresponding TLB (i.e., when a "miss" occurs), the processors perform the above-described page table walk to acquire the desired page table entry—and may cache a copy of information from the acquired page table entry in the corresponding TLB.

Overview

In the described embodiments, an electronic device includes a processor, one or more levels of cache memories (or "caches"), a memory (e.g., a "main" memory), and a storage device. The processor includes a prefetcher functional block that prefetches data by speculatively acquiring copies of data from a lower-level cache (and, if necessary, the memory or the storage device) and storing the copies of the data in a first level (L1) data cache. The processor also includes a promotion logic functional block that speculatively promotes prefetched data from the L1 data cache to physical registers (i.e., register circuitry in the processor). For "promoting" prefetched data, the promotion logic functional block selects portions of prefetched data in cache blocks in the L1 data cache and stores copies of the portions of the prefetched data in physical registers. The promoted prefetched data stored in the physical register can then be provided to micro-operations that are dependent on/use the data instead of waiting for the promoted prefetched data to be loaded via load micro-operations. In other words, the promotion logic copies prefetched data from the L1 data cache to physical registers so that the prefetched data is available to be quickly provided to micro-operations that are dependent on load micro-operations that load the promoted prefetched data—rather than waiting for the load micro-operations to complete execution.

In some embodiments, the promotion logic functional block (or another functional block) trains a data loading record in preparation for promoting prefetched data. For this operation, the promotion logic functional block monitors portions of cache blocks in the L1 data cache from which data is loaded into physical registers. In other words, the promotion logic functional block tracks load micro-operations during which portions such as individual bytes or groups thereof are loaded from cache blocks in the L1 data cache into physical registers (e.g., as operands for micro-operations to be executed, etc.). The promotion logic functional block keeps, in entries in a data loading record, information about data and portions of cache blocks from which the data was loaded to physical registers. For example, in some embodiments, the promotion logic functional block keeps, in each entry in the data loading record, a virtual address associated with data and an identification a portion (or each portion) of the data that was loaded to a physical register. The promotion logic functional block, when subsequently promoting prefetched data, uses the data loading record to identify portions of cache blocks from which prefetched data is to be promoted. In other words, the data loading record includes information about data that was previously loaded to physical registers that is used for determining prefetched data to be promoted to physical registers, which can help to increase the probability of promoting prefetched data that will be used for executing micro-operations.

In some embodiments, before prefetched data is promoted from a cache block, the promotion logic functional block checks a set of promotion conditions to ensure that the promotion conditions are met. In these embodiments, prefetched data is not promoted unless the promotion conditions are met. Generally, the promotion conditions include conditions (i.e., rules, etc.) that are used for limiting the promotion of prefetched data to situations in which the prefetched data can be stored in a physical register correctly/properly, efficiently, etc. For example, in some embodiments, the promotion logic functional block determines whether a physical register is available for storing the promoted prefetched data. In some of these embodiments, a specified number of physical registers are allocated—as "promotion" registers—for storing promoted prefetched data—and may be reserved for storing only promoted prefetched data. As another example, in some embodiments, prefetched data may not be promoted unless there is a record associated with the prefetched data in the data loading record, and thus the portion of the data to be promoted can be determined. As yet another example, in some embodiments, prefetched data may not be promoted from a portion of a cache block when a demand request (i.e., a request to load the prefetched data to a physical register) is pending for data in the portion of the cache block. As yet another example, in some embodiments, data may be promoted when promotion conditions having to do with the likelihood of the data being used while stored in the promotion register are met.

In some embodiments, for promoting prefetched data, the promotion logic functional block first monitors prefetch operations to determine when data has been prefetched into the L1 data cache. For example, the promotion logic functional block may snoop prefetch requests or receive communications from the prefetcher functional block indicating data that has been prefetched. Upon determining that data has been prefetched into a cache block in the L1 data cache, the promotion logic functional block checks the promotion conditions as described above to determine whether the prefetched data in the cache block can be promoted (for this example, it is assumed that the prefetched data can be promoted). The promotion logic functional block then acquires, from the data loading record, an identifier for a portion of the cache block from which the prefetched data is to be promoted. The promotion logic functional block next promotes prefetched data from the portion of the cache block into an available promotion register. In other words, the promotion logic functional block acquires prefetched data from the portion of the cache block in the L1 data cache (e.g., one or more bytes of the cache block) and stores the prefetched data in the available promotion register. The promotion logic functional block then updates an entry in a data promotion record to indicate that the prefetched data is stored in the promotion register.

In some embodiments, continuing the example from the previous paragraph, upon subsequently encountering a load micro-operation that loads data into a destination physical register, the promotion logic functional block checks the data promotion record to determine whether data for the load micro-operation has been promoted from the portion of the cache block to a promotion register (it is assumed for this example that the load micro-operation loads the prefetched promoted data). Because the prefetched data was previously promoted, the promotion logic functional block determines that the data that is loaded by the load micro-operations is present in the promotion register. The promotion logic functional block then provides the promoted prefetched data stored in the promotion register to micro-operations that depend on the load micro-operation. For example, the promotion logic functional block may acquire the promoted prefetched data from the promotion register and broadcast the promoted prefetched data to reservation stations or other functional blocks so that the dependent micro-operations can substantially immediately use the promoted prefetched data (i.e., instead of waiting for data to be loaded to the destination register). The promotion logic functional block may also move the data from the promotion register to a destination physical register for the load micro-operation so that other functional blocks in the processor that expect the load micro-operation's data to be present in the destination physical register can continue operations without changing the identity of the destination physical register. The processor also completes execution of the load micro-operation and the promotion logic functional block checks to ensure that the load micro-operation completed successfully and the data loaded by the load micro-operation matches the promoted prefetched data—and performs corrective actions if the checks fail.

In some embodiments, after the checks find that the load micro-operation completed successfully and the promoted prefetched data matched the loaded data, the promotion logic functional block removes the corresponding information in the data promotion record and releases the promotion register. In other words, after the promoted prefetched data is provided to the dependent micro-operations, the promotion logic functional block clears the entry in the data promotion record and makes the promotion register available for being used for storing other data.

In some embodiments, in specified situations, the promotion logic functional block invalidates or discards promoted prefetched data from promotion registers. Generally, when promoted prefetched data conflicts with other data, is no longer likely to be correct/current, and/or is unlikely to be used, the promotion logic functional block invalidates or discards the promoted prefetched data from the promotion registers. In some embodiments, invalidating or discarding the promoted prefetched data includes both releasing the promotion register (i.e., freeing the promotion register to be allocated for storing other data) and removing corresponding information from the data promotion record. For example, in some embodiments, when promoted prefetched data in a physical register is consumed/used by a load micro-operation, the promotion logic functional block (or another functional block) updates the load micro-operation's destination operand (i.e., physical register) and invalidates or discards the promoted prefetched data from the promotion register. As another example, in some embodiments, upon encountering an eviction or invalidation of prefetched data in a cache block from which prefetched data was promoted, the promotion logic functional block invalidates or discards corresponding promoted prefetched data from a promotion register. As another example, upon determining that the prefetched data was unnecessarily prefetched and will not be used (e.g., for a prefetch that turns out to be for data that is not used), the promotion logic functional block invalidates or discards the promoted prefetched data from the corresponding promotion register.

In some embodiments, when promoting prefetched data, the promotion logic functional block acquires information from the prefetcher functional block and possibly other functional blocks that is associated with the prefetched data. The promotion logic functional block then uses the information for updating entries in the above-described data promotion record to indicate that the prefetched data is stored in the promotion register. For example, in some embodiments, the prefetcher functional block uses virtual addresses for prefetching data and the promotion logic functional block records, in the data promotion record, information about the virtual addresses associated with promoted prefetched data. As another example, in some embodiments, the prefetcher functional block uses program counters associated with instructions (or groups thereof) for prefetching data and the promotion logic functional block records, in the data promotion record, information about the program counters and the virtual addresses associated with promoted prefetched data. In these embodiments, when checking the data promotion record to determine if promoted prefetched data is available for a given load micro-operation, the promotion logic functional block uses similar information (e.g., virtual addresses, virtual addresses and program counters, etc.) for searching the data promotion record. In some of these embodiments, the virtual addresses that are used to check the data promotion record for load instructions are predicted/speculative virtual addresses.

In some embodiments, the promotion logic functional block promotes prefetched data automatically following a prefetch operation in which the prefetched data is stored in the cache block in the cache memory. In these embodiments, the promotion of prefetched data—and thus the storage of prefetched data in a promotion register—occurs independent of a load micro-operation. In other words, in some embodiments, the promotion of prefetched data from portions of cache blocks in the L1 data cache is not triggered or caused by, and does not require, a load micro-operation that loads data from the portions of the cache blocks to promotion registers.

By promoting and using prefetched data, the described embodiments can reduce, in comparison to existing processors, a load-use latency for load micro-operations (i.e., the delay between when load micro-operations are dispatched for execution and when corresponding data is provided to dependent micro-operations that depend on the load micro-operations). In other words, by promoting prefetched data following prefetching, the described embodiments can make data immediately available in a physical register that would otherwise have needed to have been loaded to the physical register. Reducing the load-use latency can keep execution functional blocks in the processor busier executing dependent micro-operations, which improves the operation of the processor. Improved operation of the processor increases user satisfaction with the processor and electronic devices that use the processor.

Electronic Device

Figure 2:
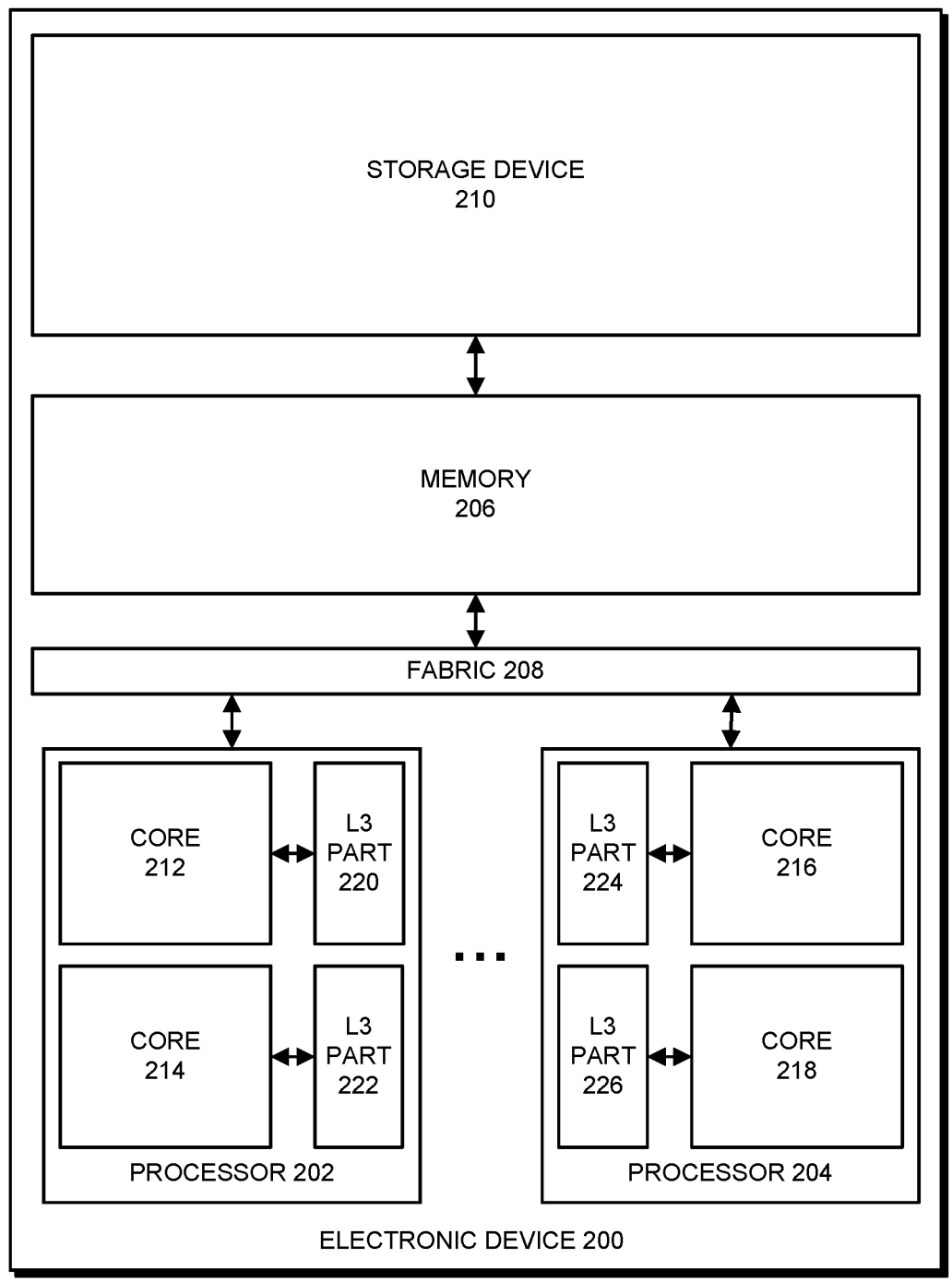
FIG. 2 presents a block diagram illustrating an electronic device in accordance with some embodiments.

FIG. 2 presents a block diagram illustrating electronic device 200 in accordance with some embodiments. As can be seen in FIG. 2, electronic device 200 includes processors 202 and 204, memory 206, and fabric 208. Processors 202 and 204, memory 206, and fabric 208 are all implemented in "hardware," i.e., using corresponding circuitry. For example, in some embodiments, processors 202 and 204, memory 206, and fabric 208 are entirely fabricated in integrated circuitry on one or more semiconductor chips, possibly on one or more separate semiconductor chips, are fashioned from semiconductor chips in combination with discrete circuitry, or are fabricated from discrete circuitry alone. Electronic device 200 also includes storage device 210, which is a functional block, device, and/or element that includes a higher-capacity non-volatile memory for storing instructions and data for use by other functional blocks in electronic device 200. For example, storage device 210 can be or include one or more hard disks, optical disks, magnetic tapes, non-volatile semiconductor memories, etc.

Processors 202 and 204 are functional blocks that perform computational, memory access, and other operations (e.g., control operations, configuration operations, etc.) in electronic device 200. For example, processors 202 and 204 can be or include one or more central processing units (CPUs), graphics processing units (GPUs), application specific integrated circuits (ASICs), field programmable gate arrays (FPGAs), and/or other processing elements or devices. Processors 202 and 204 include cores 212-214 and 216-218, respectively, which are each a functional block such as a CPU core, a GPU core, an ASIC, an FPGA, etc. that performs computational, memory access, and other operations in the respective processor. Processors 202-204 also include level three (L3) cache parts (L3 PART) 220-222 and 224-226, respectively, which are each a cache memory functional block that includes memory circuitry such as static random access memory (SRAM) memory circuitry for storing copies of instructions and data, and control circuitry for storing the copies of the instructions and data in the memory circuitry, accessing stored copies of instructions and data, etc.

In some embodiments, L3 cache parts 220-226 are shared among cores 212-218, and therefore the memory circuitry in each of L3 cache parts 220-226 can be used for storing copies of instructions and data from any of cores 212-218 and/or the instructions and data stored in L3 cache parts 220-226 can be accessed by any of cores 212-218. In these embodiments, L3 cache parts 220-226 can be considered as a group form a shared L3 cache in electronic device 200. In some embodiments, there is a preference for storing copies of instructions and data in a "local" L3 cache part such as L3 cache part 220 for core 212, etc.

Memory 206 is functional block that performs operations of a memory (e.g., a "main" memory) in electronic device 200. Memory 206 includes volatile memory circuitry such as fourth-generation double data rate synchronous DRAM (DDR4 SDRAM) memory circuitry for storing copies of instructions and data for use by the other functional blocks in electronic device 200 and control circuitry for storing, accessing, etc. copies of instructions and data in the memory circuitry and for performing other control or configuration operations. In some embodiments, copies of instructions and data are retrieved (e.g., in 4 kB blocks or "pages") from storage device 210 and stored in memory 206 for use by various functional blocks in electronic device 200.

Fabric 208 is a functional block that includes communication routes that are used for communicating instructions, data, control signals, and/or other information between functional blocks (e.g., processor 202, memory 206, etc.) in electronic device 200. Fabric 208 includes one or more serial or parallel buses (e.g., wires, guides, etc.) and circuitry (e.g., transmitters, receivers, buffers, repeaters, optical elements, etc.) that are used for communicating the instructions, data, etc. between the functional blocks. In some embodiments, communication traffic (e.g., packets, signals, messages, etc.) communicated between functional blocks using fabric 208 is arranged, formatted, and handled in accordance with one or more protocols or standards such as the Infinity Fabric standard from Advanced Micro Devices, Inc. of Santa Clara, Calif.

Electronic device 200 is simplified for illustrative purposes. In some embodiments, however, electronic device 200 includes additional or different functional blocks, subsystems, and/or elements. For example, electronic device 200 may include display subsystems, power subsystems, input-output (I/O) subsystems, etc. In addition, although electronic device 200 is shown with certain functional blocks and elements, in some embodiments, electronic device 200 includes different functional blocks or elements. For example, in some embodiments, electronic device 200 includes a different number of processors (as shown using the ellipsis in FIG. 2), from one processor to many processors. As another example, although L3 cache parts 220-226 are shown in FIG. 2, in some embodiments, there is no L3 cache or the L3 cache is organized differently (e.g., not split into parts). As yet another example, in some embodiments, electronic device 200 is arranged with multiple memory parts (instead of one memory 206 as shown in FIG. 2), such as with memory parts associated with individual processors in a non-uniform memory access (NUMA) arrangement, etc. Generally, in the described embodiments, electronic device 200 includes sufficient functional blocks and elements to perform the operations described herein.

Figure 3:
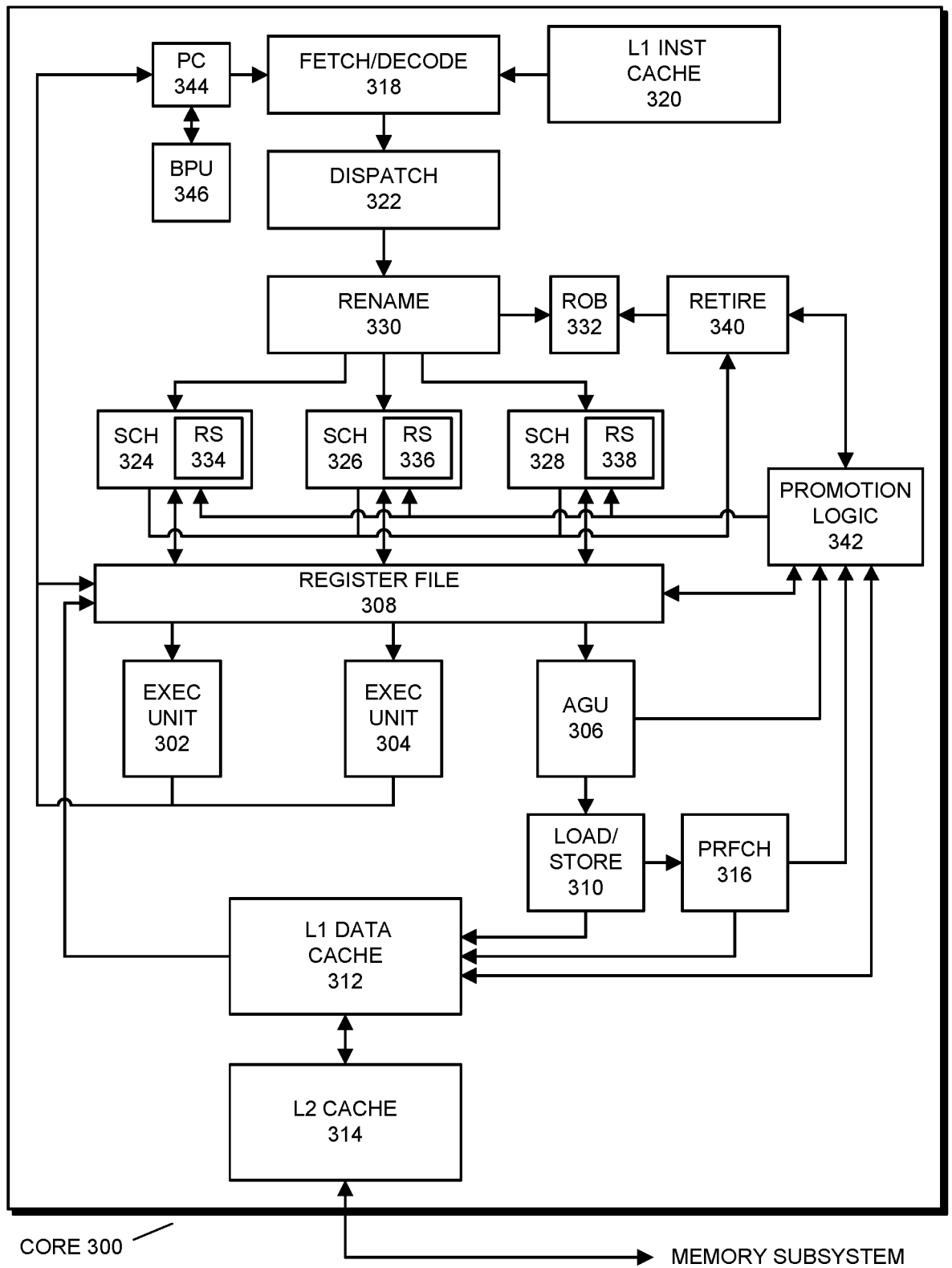
FIG. 3 presents a block diagram illustrating a core in accordance with some embodiments.

Electronic device 200 can be, or can be included in, any device that performs the operations described herein. For example, electronic device 200 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof Processor Core In the described embodiments, an electronic device includes a core in a processor, or a "processor core," that performs operations for promoting prefetched data from a first level data cache to physical registers. FIG. 3 presents a block diagram illustrating a core 300 in accordance with some embodiments. In some embodiments, some or all of cores 212-218 include similar functional blocks to those shown in core 300, i.e., are internally arranged similarly to core 300.

As can be seen in FIG. 3, core 300 includes execution (EXEC) units 302-304, each of which is a functional block that includes circuitry for executing micro-operations. For example, each of execution units 302-304 can include execution pipelines, compute units, FPGAs, and/or other micro-operation execution circuitry that processes micro-operations and performs corresponding operations. In addition, core 300 includes address generation unit (AGU) 306, which is a functional block that performs operations for computing addresses (e.g., virtual addresses) for load and store micro-operations. Although labeled differently in FIG. 3 for illustrative purposes, in some embodiments, address generation unit 306 is similar to execution units 302-304 and can therefore execute various types of micro-operations in addition to computing addresses.

In some embodiments, some or all of execution units 302-304 and address generation unit 306 are arranged for, and possibly dedicated to, executing particular types of micro-operations. For example, in some embodiments, execution unit 302 is a simpler integer execution unit that includes circuitry that is arranged for executing simpler micro-operations from among a set of micro-operations supported by core 300 (e.g., simpler logic micro-operations, simpler mathematical micro-operations, micro-operations that can be executed in only a few cycles of a controlling clock, etc.) and execution unit 304 is a more complex integer execution unit that includes circuitry arranged for executing more complex micro-operations from among a set of micro-operations supported by core 300 (e.g., more complex logic micro-operations, more complex mathematical micro-operations, micro-operations that need more than a few cycles of a controlling clock to execute, etc.). As another example, in some embodiments, execution unit 302 is an integer execution unit that includes circuitry arranged for executing integer micro-operations and execution unit 304 is a floating point execution unit that includes circuitry arranged for executing floating point micro-operations.

Core 300 also includes register file 308, which is a functional block that includes circuitry for a set of physical registers. Register file 308 includes storage elements (i.e., a number of register file cells, write and read lines/ports, etc.) and access circuitry that is used for storing operands for and results from executing micro-operations in the storage elements. The physical registers in register file 308 are called "physical" registers to distinguish these registers from "architectural" registers, the architectural registers being logical registers included in an instruction set architecture for core 300.

Core 300 further includes load/store unit (LOAD/STORE) 310, which is a functional block that includes circuitry for processing loads and stores of data for core 300. In some embodiments, for loading data, load/store unit 310 acquires data from L1 data cache 312—or, if necessary, from L2 cache 314, an L3 cache (e.g., one of L3 cache parts 220-226), a memory (e.g., memory 206), or a storage device (e.g., storage device 210)—and loads/stores the data to physical registers in register file 308. In some embodiments, for storing data, load/store unit 310 acquires data from physical registers in register file 308 and stores the acquired data in L1 data cache 312—and/or in L2 cache 314, the L3 cache, the memory, or the storage device.

Core 300 further includes prefetcher (PRFCH) 316, which is a functional block that includes circuitry for prefetching data into L1 data cache 312 from L2 cache 314 or elsewhere in a memory subsystem (i.e., the L3 cache, the memory, and/or the storage device). In some embodiments, prefetcher 316 monitors loads of data into L1 data cache 312 (and/or other operations of core 300) and speculatively loads, or "prefetches," subsequent data into L1 data cache 312 in anticipation of the data being useful for executing micro-operations. In other words, in some embodiments, in an effort to have data already loaded to L1 data cache 312 for executing micro-operations (or other operations), prefetcher 316 predicts that given data will be used for executing micro-operations and prefetches the given data into L1 data cache 312. For example, in some embodiments, prefetcher 316 detects or determines addresses from which data is loaded (via load instructions, etc.) into cache lines in L1 data cache 312 and then prefetches subsequent N-byte blocks of data to be stored in cache lines in L1 data cache 312 (where N=64, 128, or another number). In some cases, prefetched data is eventually used for executing micro-operations and thus is "accurately" prefetched. In other cases, however, the prefetched data is not used for executing micro-operations and thus is "inaccurately" prefetched—and may be evicted from L1 data cache 312 without ever having been used.

In some embodiments, prefetcher 316 prefetches data in accordance with or based on a specified prefetching pattern. For example, the prefetcher can be a next line prefetcher that prefetches one or more "next" lines (e.g., N-byte cache lines) from an address in memory that follows an address of a cache line or portion thereof from which data was loaded by a load instruction. As another example, the prefetcher can be a strided prefetcher that prefetches one or more lines (e.g., N-byte cache lines) at a given "stride" or memory address offset from an address of a cache line or portion thereof from which data was loaded by a load instruction. As yet another example, in some embodiments, prefetcher 316 keeps one or more records of patterns of data accesses, i.e., of patterns of addresses in memory from which data has been loaded, and uses the records (possibly along with other information) for determining the addresses of data in memory that is to be prefetched.

In some embodiments, prefetcher 316 uses virtual addresses (i.e., byte addresses) for prefetching data into L1 data cache 312. In these embodiments, therefore, virtual addresses computed for micro-operations are used by prefetcher 316 for prefetching data into L1 data cache 312—and may be used for keeping track of data access patterns within a memory region. Given a virtual address of a particular load instruction that falls into a given memory region, therefore, prefetcher 316 can prefetch data (e.g., one or more N-byte cache lines or portions thereof) into L1 data cache 312 by generating other respective virtual addresses (e.g., from a next virtual address, from a virtual address at a given stride, etc.).

In some embodiments, prefetcher 316 uses program counters to track data access patterns for prefetching data into L1 data cache 312. In these embodiments, therefore, program counters associated with micro-operations are used by prefetcher 316 for tracking data access patterns and prefetching data into L1 data cache 312. Given a program counter associated with a particular load instruction, prefetcher 316 can prefetch data (e.g., one or more N-byte cache lines or portions thereof) into L1 data cache 312 by generating respective virtual addresses using the data access patterns associated with the program counter.

Core 300 further includes fetch/decode unit (FETCH/DECODE) 318. Fetch/decode unit 318 is a functional block that includes circuitry for fetching program code instructions (or groups thereof) from L1 instruction cache 320 or elsewhere in the memory subsystem and decoding the fetched instructions into micro-operations. After decoding micro-operations, fetch/decode unit 318 sends the micro-operations to dispatch 322. Dispatch 322 is a functional block that includes circuitry for selecting schedulers from among schedulers 324-328 to which micro-operations are to be forwarded for execution and dispatching (i.e., forwarding, sending, etc.) the micro-operations to the selected schedulers.

As described above, in some embodiments, some or all of execution units 302-304 and address generation unit 306 are arranged, and possibly dedicated to, processing particular types of instructions. In some of these embodiments, schedulers 324-328 will ordinarily only handle instructions of the type to be processed by the respective execution unit. For example, assuming that address generation unit 306 computes addresses for load and store instructions, scheduler 328, which services execution unit address generation unit 306, will ordinarily only handle load and store micro-operations. In some embodiments, therefore, the above-described selecting operation involves dispatch 322 selecting a scheduler that handles each micro-operation based on a type of that micro-operation.

Core 300 further includes rename unit (RENAME) 330, which is a functional block that includes circuitry for assigning physical registers in register file 308 for storing operands for and/or results from executing micro-operations. Generally, micro-operations initially refer to architectural registers, which are a set of registers in an instruction set architecture for core 300. The architectural registers referenced by micro-operations are, however, abstract/logical and are normally not directly used for addressing physical registers in core 300. Instead, the architectural registers referred to by micro-operations are mapped to a set of physical registers in register file 308 by rename unit 330. When a micro-operation refers to (e.g., stores a result to, etc.) a given architectural register, therefore, rename unit 330 selects an allowable and available physical register in register file 308 to be used for the micro-operation and redirects the micro-operation to use the physical register.

Core 300 further includes reorder buffer (ROB) 332, which is a functional block that includes circuitry that is used for managing out-of-order execution of micro-operations. Generally, core 300 can execute micro-operations "out of order," i.e., in a different order than the order in which the micro-operations are encountered in program code, as long as the micro-operations are permitted to be executed out of order (i.e., do not have dependencies on one another, are retired in a specified order, etc.). Reorder buffer 332 includes circuitry that is used for, among other things, keeping track of in-flight micro-operations to ensure that micro-operations are retired in the correct order—and therefore are used to update an operating/architectural state (i.e., L1 data cache 312, flags, settings, control values, etc.) of core 300 in the proper order.

Core 300 further includes schedulers (SCH) 324-328, which are functional blocks that include circuitry for scheduling the execution of micro-operations in a respective execution unit. For example, in some embodiments, scheduler 324 controls the scheduling of micro-operations for execution in execution unit 302. Each of schedulers 324-328 includes circuitry (e.g., a reservation station, etc.) for storing micro-operations awaiting execution. Each of schedulers 324-328 also includes picker logic circuitry that prepares and checks the micro-operations for execution (e.g., checks the presence of operands, etc.), acquires micro-operations that are ready for execution, and forwards the ready micro-operations for processing in the respective execution unit.

The reservation station in each of into schedulers 324-328, i.e., reservation stations (RS) 334-338, is a functional block that includes circuitry for retaining records of and storing operands to be used for executing micro-operations. In some embodiments, as a given micro-operation is received in a scheduler, the scheduler (or the reservation station itself) records information about the given micro-operation and operands that are ready for the given micro-operation in a reservation station entry (e.g., immediate operands, etc.) and reserves space in the reservation station for operands that are not yet ready. For example, if the given micro-operation has a dependency on an operand that is to be produced by a prior instruction that is being executed or is eventually to be executed, the reservation station records an identifier for the physical register upon which the given micro-operation depends in the reservation station entry. When the operands eventually become available, the scheduler receives a copy of the operands (e.g., from register file 308, etc.) and updates the reservation station entry with the operands. When all operands for the given operation are present in the reservation station entry, the given micro-operation is ready to be scheduled, i.e., to be sent from the scheduler to the corresponding execution unit.

Core 300 further includes retire unit (RETIRE) 340, which is a functional block that includes circuitry for receiving, e.g., from schedulers 324-328 and/or other functional blocks, information about micro-operations that have completed execution and committing the micro-operations to an architectural state of core 300. For example, in some embodiments, retire unit 340 interacts with reorder buffer 332 to ensure that completed instructions can safely and correctly be retired, permits instruction results to be committed/written to L1 data cache 312 and/or elsewhere in the memory subsystem, permits processor flags and control values to be set/updated, etc.

Core 300 further includes promotion logic 342, which is a functional block that includes circuitry that performs operations associated with promoting prefetched data from L1 data cache 312 to physical registers in register file 308. Generally, for "promoting" prefetched data, promotion logic 342 selects portions of cache blocks in L1 data cache 312 that were prefetched by the prefetcher 316 and copies the prefetched data from the portions of cache blocks in L1 data cache 312 to physical registers in anticipation of the prefetched data being useful for subsequent micro-operation execution. For example, in some embodiments, promotion logic 342 selects portions of N-byte cache lines or combinations thereof in L1 data cache 312 based on a data type (e.g., integer, floating point, vector, etc.) of a physical register that is to be used to store the promoted data and stores the selected portions of the N-byte cache lines in the physical register. In some embodiments, promotion logic 342 promotes prefetched data automatically following a prefetch operation in which the prefetched data is stored in the cache block in L1 data cache 312. In some of these embodiments, promotion logic 342 promotes prefetched data "in hardware" (i.e., using purpose-specific circuitry)— and does not require an instruction requesting or triggering the promotion of the prefetched data. The operations of promotion logic 342 for selecting prefetched data to be promoted, promoting prefetched data, and using promoted prefetched data are described in more detail below.

Core 300 further includes program counter (PC) 344, which is a functional block that includes circuitry that performs operations for determining an address in memory, or "program counter," for a next instruction (or group thereof) to be fetched by fetch/decode unit 318 from L1 instruction cache 320 for execution. When program/instruction flow is not changed by control transfer instructions (e.g., branch instructions, etc.), program counter 344 uses sequential values for the program counter. Otherwise, when program/instruction flow is changed by control transfer instructions, program counter 344 receives updates to the program counter from execution units 302-304 and/or other functional blocks.

Core 300 further includes branch prediction unit (BPU) 346, which is a functional block that includes circuitry that performs operations for predicting resolutions of control transfer instructions and modifying the program counter—and thus the address in memory from which subsequent instruction groups are fetched. In other words, branch prediction unit 346, using one or more records of control transfer instruction behavior, predicts a "taken" or "not-taken" resolution of control transfer instructions and provides a predicted target address for taken control transfer instructions. When a control transfer instruction is predicted taken by branch prediction unit 346, branch prediction unit 346 can replace a next or subsequent program counter provided by program counter 344 with a target address for the control transfer instruction.

Core 300 is shown in FIG. 3 with various functional blocks in order to provide an illustrative framework for the particular functional blocks and operations performed thereby for the described embodiments. Core 300 is, however, simplified for illustrative purposes and for clarity and brevity in describing some embodiments. In some embodiments, core 300 includes different functional blocks and/or arrangement of functional blocks than what is shown in FIG. 3. For example, in some embodiments, core 300 includes a different number of execution units and schedulers (and may include a single unified scheduler for multiple execution units). Generally, in the described embodiments, core 300 includes sufficient functional blocks to perform the operations described herein.

Although promotion logic 342 is described as a separate functional block that performs various operations for promoting prefetched data from portions of cache blocks to physical registers, in some embodiments, other functional blocks perform some or all of the operations—or portions of such functional blocks can be considered part of the promotion logic 342 for the description herein. For example, in some embodiments, dispatch 322, prefetcher 316, load/store unit 310, and/or schedulers 324-328 can perform some or all of the operations. Generally, in the described embodiments, core 300 includes one or more functional blocks that perform operations for promoting prefetched data from portions of cache blocks to physical registers as described herein.

Keeping a Data Loading Record

Figure 4:
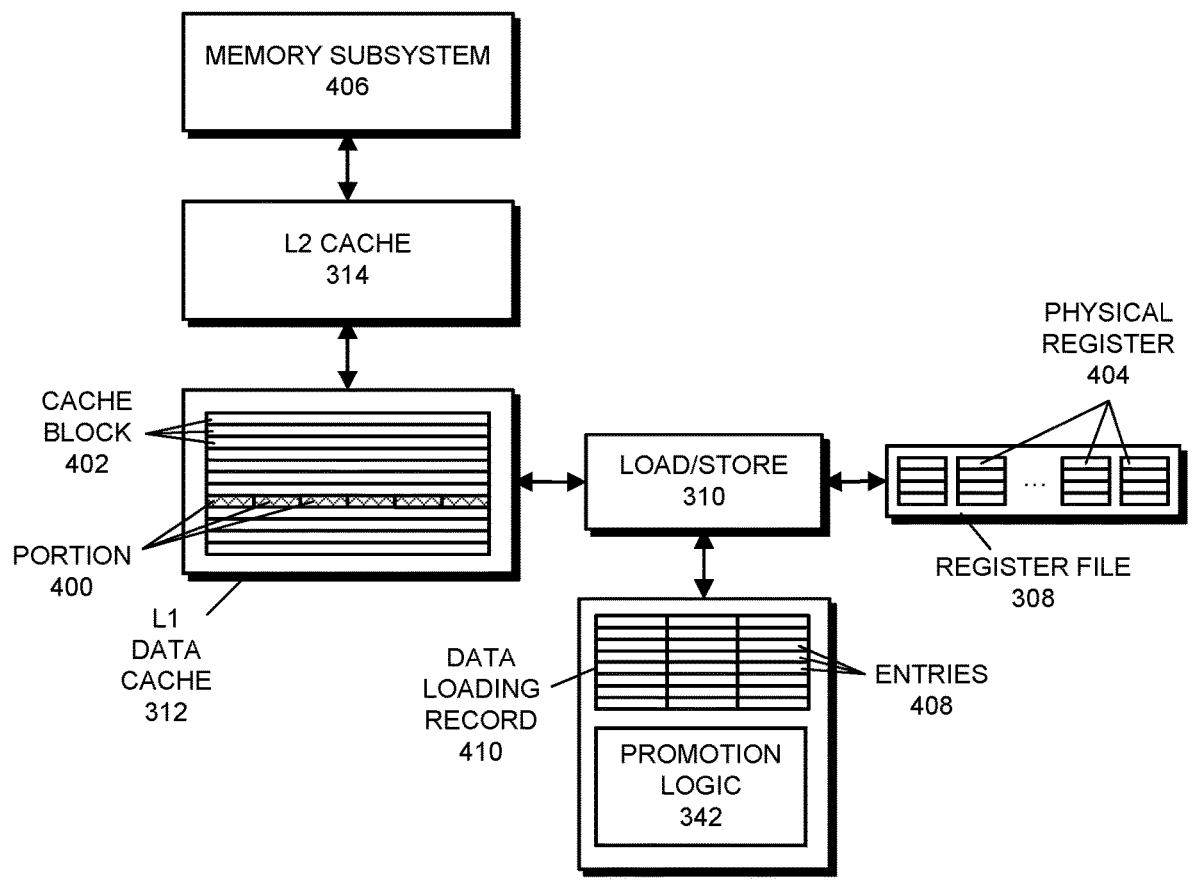
FIG. 4 presents a block diagram illustrating functional blocks in a processor that perform operations associated with keeping a data loading record in accordance with some embodiments.
Figure 5:
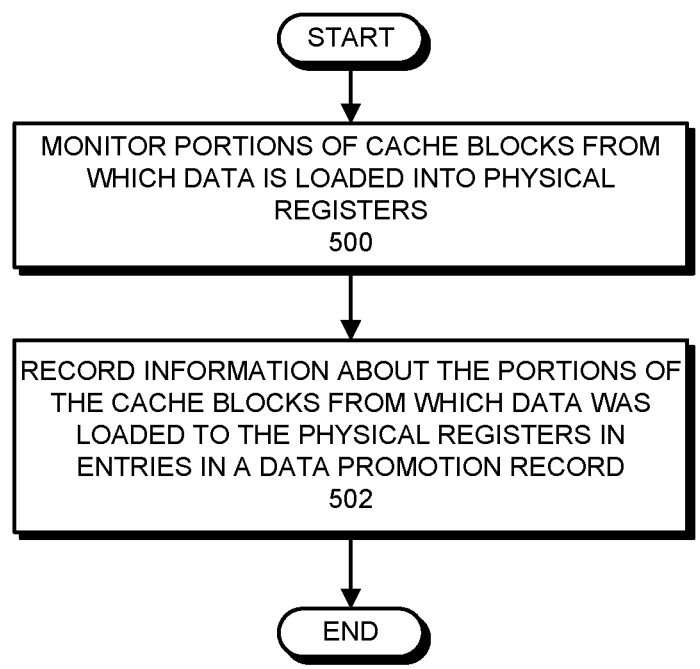
FIG. 5 presents a flowchart illustrating a process for keeping a data loading record in accordance with some embodiments.

In the described embodiments, a promotion logic functional block (or another functional block) keeps, in a data loading record, information about portions of cache blocks from which data is loaded to physical registers. The promotion logic functional block then uses the data loading record for identifying portions of the cache blocks from which prefetched data is to be promoted. FIG. 4 presents a block diagram illustrating functional blocks in a processor that perform operations associated with keeping the data loading record in accordance with some embodiments. FIG. 5 presents a flowchart illustrating a process for keeping a data loading record in accordance with some embodiments. FIGS. 4-5 are presented as general examples of functional blocks and operations performed by some embodiments. Some embodiments, however, include different functional blocks and/or different functional blocks perform the operations. In addition, some embodiments perform different operations and/or perform the operations in a different order.

In FIG. 4, the illustrated functional blocks include some of the functional blocks shown in electronic device 200 in FIG. 2 or core 300 in FIG. 3. Some of the functional blocks in FIGS. 2-3 are not shown in FIG. 4 for clarity. In addition, in FIG. 4, only a few of some figure elements (e.g., portions 400, cache blocks 402, etc.) are labeled for clarity.

The process shown in FIG. 5 starts with a promotion logic functional block monitoring portions of cache blocks from which data is loaded into physical registers (step 500). Turning to FIG. 4, this operation involves promotion logic 342 monitoring load/store unit 310's loads of data from L1 data cache 312 to determine portions 400 of cache blocks 402 from which data is loaded to physical registers 404 in register file 308. For example, in some embodiments, promotion logic 342 receives communications from load/store unit 310 and/or other functional blocks that identify load micro-operations (e.g., identify virtual addresses, program counters, or other information for the load micro-operations) and the portions 400 of cache blocks 402 from which data is loaded to physical registers 404. In some cases, the data that is loaded from portions 400 of cache blocks 402 is not initially present in L1 data cache 312 and is therefore fetched into L1 data cache 312 from L2 cache 314—and possibly from memory subsystem 406 (where the "memory subsystem" includes L3 cache parts 220-226, memory 206, and storage device 210).

For the operation in step 500, cache blocks 402 are N-byte cache blocks in L1 data cache 312, where N=64, 128, or another number. For example, in some embodiments, cache blocks 402 are 64 byte cache lines. The portions 400 are M-byte parts or subsections of cache blocks 402, where M is less than N. For example, in some embodiments, each of the portions 400 is equal in size to physical registers 404 in terms of the bytes included in that portion 400. For instance, if each physical register 404 is configured for storing four byte integer values, each of the portions 400 is four bytes in size. In these embodiments, therefore, promotion logic 342 monitors the loading of data from the M-byte portions 400 of N-byte cache blocks 402 in L1 data cache 312 to M-byte physical registers.

Promotion logic 342 then records information about the portions of the cache blocks from which data was loaded to the physical registers in entries in a data promotion record (step 502). In other words, promotion logic 342, based on the portions 400 of cache blocks 402 from which data is loaded to physical registers 404 as determined during the monitoring, updates entries 408 in data loading record 410 with information about the portions 400. For some or all of the portions 400 from which data is loaded, therefore, promotion logic 342 stores, in respective entries 408, information about those portions 400. In some embodiments, data loading record 410 has a limited number of entries 408 and a replacement policy (e.g., least recently used, oldest, round robin, etc.) may be used for determining entries 408 to be overwritten if and when all of the entries 408 become full.

In step 502, the information recorded in entries 408 in data loading record 410 by promotion logic 342 includes information sufficient for later determining the portions 400 of cache blocks 402 that were loaded to physical registers 404. Generally, the information in each entry 408 includes an identifier associated with a load micro-operation that loaded the data to the physical register 404 and an indication of the portion(s) 400 from which data was loaded. For example, in some embodiments, the entries 408 include—and may be indexed by—virtual addresses from the load micro-operations and bit strings/sequences that identify the portion(s) 400 from which data was loaded. For instance, in some embodiments, assuming that there are 16 four byte portions in each cache block 402, the bit string in each entry 408 can include 16 bits, with each bit representing a different portion and value of 1 being used in bit positions associated with portion(s) from which data was loaded. In some embodiments, the information recorded in entries 408 includes other information, such as validity information, etc.

Although not shown in FIG. 5, in some embodiments, the promotion logic functional block removes or invalidates selected entries in the data loading record to free up space in data loading record 410. For example, in some embodiments, the promotion logic functional block associates a timestamp with each entry in the data loading record and removes or invalidates a given entry when the timestamp is more than a threshold value smaller than a timer that is maintained by the promotion logic functional block.

Promoting Prefetched Data from a Cache to Physical Registers

Figure 6:
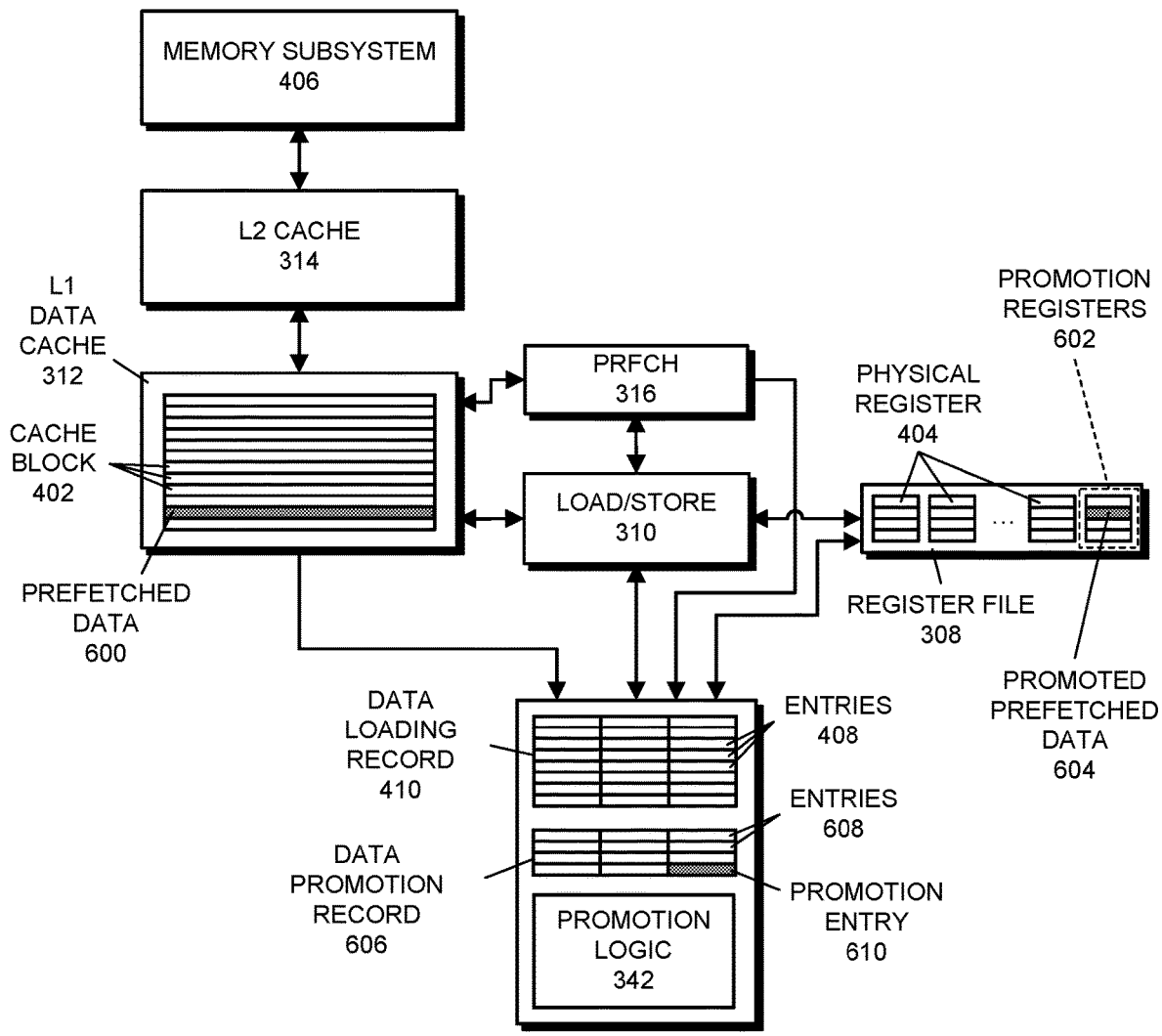
FIG. 6 presents a block diagram illustrating functional blocks that perform operations associated with promoting prefetched data from portions of cache blocks to physical registers in accordance with some embodiments.
Figure 7:
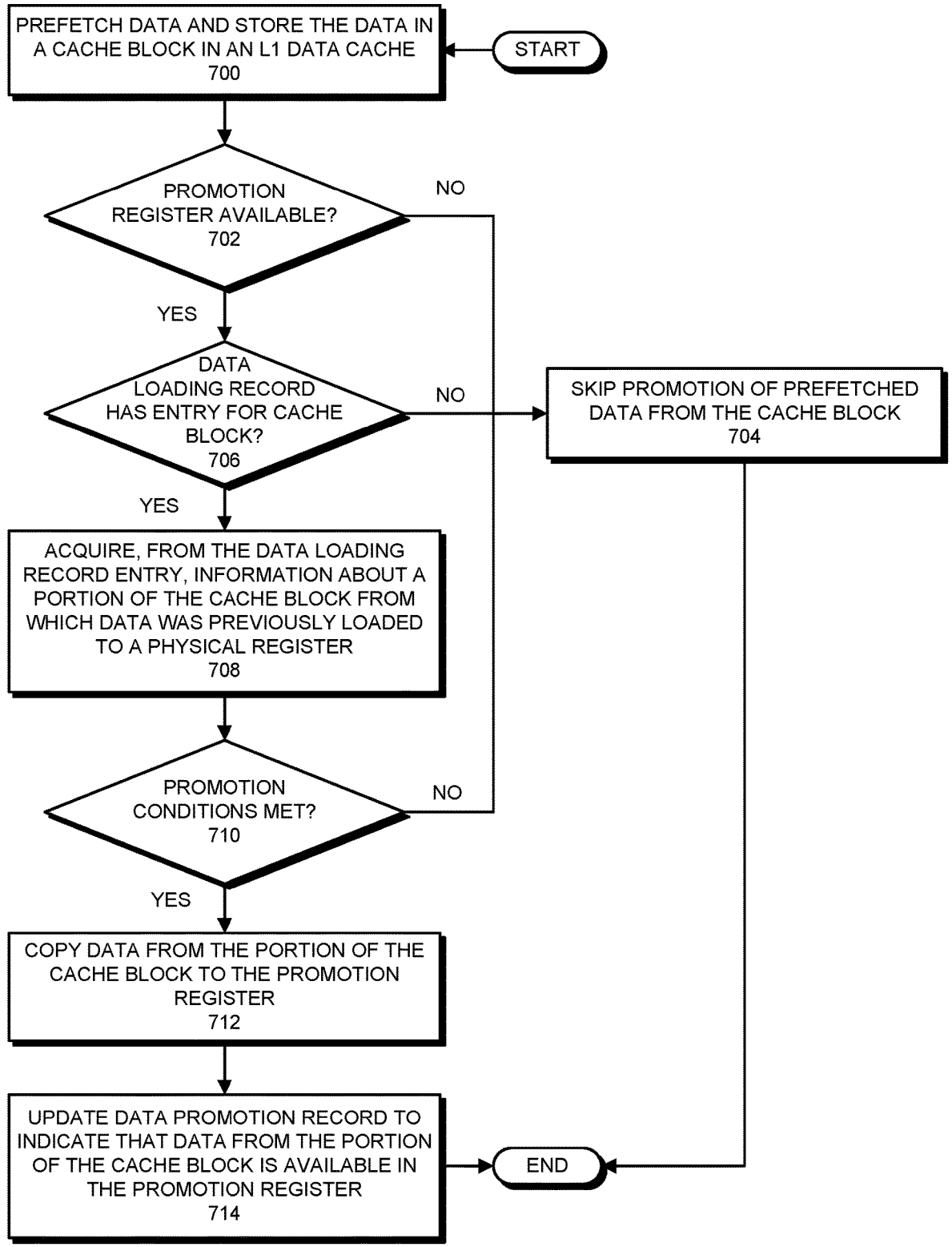
FIG. 7 presents a flowchart illustrating a process for promoting prefetched data from portions of cache blocks to physical registers in accordance with some embodiments.

In the described embodiments, a promotion logic functional block performs operations for promoting prefetched data from portions of cache blocks to physical registers. FIG. 6 presents a block diagram illustrating functional blocks that perform operations associated with promoting prefetched data from portions of cache blocks to physical registers in accordance with some embodiments. FIG. 7 presents a flowchart illustrating a process for promoting prefetched data from portions of cache blocks to physical registers in accordance with some embodiments. FIGS. 6-7 are presented as general examples of functional blocks and operations performed by some embodiments. Some embodiments, however, include different functional blocks and/or different functional blocks perform the operations. In addition, some embodiments perform different operations and/or perform the operations in a different order. For example, in some embodiments, some of the checks shown in steps 702, 706, and 710 are performed substantially at the same time (i.e., substantially in parallel) or in a different order.

In FIG. 6, the illustrated functional blocks include some of the functional blocks shown in electronic device 200 in FIG. 2, core 300 in FIG. 3, or in FIG. 4. Some of the functional blocks in FIGS. 2-4 are not shown in FIG. 6 for clarity. Also, in FIG. 6, only a few of some figure elements (e.g., cache blocks 402, physical registers 404, etc.) are labeled for clarity.

The process shown in FIG. 7 starts when prefetcher 316 prefetches data and stores the data in a cache block in L1 data cache 312 (step 700). Turning to FIG. 6, this operation includes prefetcher 316 determining the particular data that is to be prefetched. Recall that, as described above, prefetcher 316 correlates or associates information such as a program counter or a virtual address with data that was previously loaded or is being loaded to L1 data cache 312 for determining data to be prefetched. Prefetcher 316 then causes the data to be fetched from L2 cache 314 (or, if necessary, from L3 cache parts 220-226, memory 206, or storage device 210) and stored in a cache block 402 in L1 data cache 312. The prefetched data in L1 data cache 312 is shown as prefetched data 600 in FIG. 6.

Promotion logic 342 detects or is informed of the prefetching of prefetched data 600. For example, promotion logic 342 may snoop prefetch requests and/or writes to the L1 data cache 312 to detect the prefetching of prefetched data 600. As another example, promotion logic 342 may receive communications from prefetcher 316 (or another functional block) that identify prefetched data 600. In some embodiments, the particular information that is detected or received by promotion logic 342 about prefetched data 600 depends on the information used by prefetcher 316 for prefetching the data. For example, in some embodiments, prefetcher 316 uses virtual addresses for prefetching data and thus the information includes virtual addresses. As another example, in some embodiments, prefetcher 316 uses program counters and thus the information includes program counters.

Promotion logic 342 then determines if prefetched data from a portion of the cache block is to be promoted to a physical register 404. Generally, this operation involves performing one or more checks to ensure that prefetched data from a portion of the cache block is allowed to be promoted to a physical register—and whether such a promotion is desirable given performance considerations. The following paragraphs describe some checks that can be performed for determining whether prefetched data from a portion of the cache block is to be promoted.

As one of the checks for determining whether prefetched data can be promoted, promotion logic 342 checks whether a promotion register 602 is available for storing the prefetched data (step 702). In some embodiments, some or all of physical registers 404 are allowed to be used for storing promoted prefetched data and are therefore considered "promotion registers." In some of these embodiments, a subset of physical registers 404 may be reserved and used exclusively for storing promoted prefetched data—and may be the only physical registers 404 that can be used for storing promoted prefetched data. In FIG. 6, physical registers 404 that can be used for storing promoted prefetched data are shown as promotion registers 602 (using a dashed line for clarity). The check in step 702 therefore involves determining that a promotion register 602 is available for storing the promoted data (i.e., not all promotion registers are currently being used for storing other data). If a promotion register 602 is not available, the prefetched data will not be promoted and promotion logic 342 skips promotion of the prefetched data from the cache block (step 704). By "skipping" the promotion of the prefetched data as described for step 704, promotion logic 342 proceeds with subsequent operations without storing prefetched data from a portion of the cache block into a promotion register 602. For the example in FIGS. 6-7, it is assumed that there is a promotion register 602 available—and thus promotion logic 342 does not skip promoting prefetched data due to a lack of an available promotion register.

As another of the checks for determining whether prefetched data can be promoted, the promotion logic 342 checks a data loading record 410 to ensure that data loading record 410 has an entry 408 with information about the cache block in which prefetched data 600 is stored (step 706). As described above for FIGS. 4-5, promotion logic 342 (or another functional block) records, in data loading record 410, information about portions of cache blocks 402 from which data is loaded to physical registers 404. For the operation in step 706, promotion logic 342 uses information about the prefetched data, e.g., a virtual address, a program counter, etc., to perform a lookup in data loading record 410. If no entry 408 is available in data loading record 410 with information about the cache block in which prefetched data 600 is stored—and thus it is unknown or unclear which portion of prefetched data 600 should be promoted—the prefetched data will not be promoted and promotion logic 342 skips promotion of the prefetched data from the cache block (step 704). For the example in FIGS. 6-7, it is assumed that data loading record 410 includes the corresponding entry 408—and thus promotion logic 342 does not skip promoting prefetched data 600 due to a lack of an entry 408 in data loading record 410.

Upon finding an entry 408 in data loading record 410 that has information about the cache block in which promoted prefetched data 600 is stored, promotion logic 342 acquires, from the entry 408 in data loading record 410, information about a portion of the cache block from which data was previously loaded to a physical register (step 708). For example, in some embodiments, promotion logic 342 can read a bit string/sequence in the entry 408 that identifies the portion 400 of the cache block from which data was previously loaded. Promotion logic 342 then uses the identified portion of the cache block in subsequent operations as described below.

Continuing with the checks for determining whether prefetched data can be promoted, promotion logic 342 next checks to ensure that one or more promotion conditions are met (step 710). Generally, for this operation, promotion logic 342 checks prefetched data 600, physical registers 404, specified records, and/or other software entities or hardware functional blocks to ensure that one or more promotion conditions (e.g., rules, guidelines, etc.) are met. In some embodiments, the promotion conditions are related to and indicative of the likely effectiveness (i.e., usefulness, efficiency, etc.) of promoting the prefetched data. A number of examples of promotion conditions are presented in the following paragraphs. When promotion logic 342 finds that promotion conditions—or specified combinations thereof—are not met, the prefetched data will not be promoted and promotion logic 342 skips promotion of the prefetched data from the cache block (step 704). For the example in FIGS. 6-7, it is assumed that the promotion conditions are met—and thus promotion logic 342 does not skip promoting prefetched data 600 due to a failure to meet one or more of the promotion conditions.

As an example of a promotion condition, in some embodiments, promotion logic 342 determines whether a demand request is pending for the data in the portion of the cache block. The promotion logic 342 therefore checks demand requests (e.g., from load micro-operations that load data), or at least demand requests for the portion of the cache block, to ensure that there is no pending demand request for the portion of the cache block.

As another example of a promotion condition, in some embodiments, promotion logic 342 checks to determine whether a translation lookaside buffer lookup for a prefetch request that prefetched the data into the cache block encountered a miss. Recall that a translation lookaside buffer lookup is performed to acquire virtual address to physical address translation information. When virtual address to physical address is not present in the translation lookaside buffer, the lookup "misses," and a page walk is required. In these embodiments, promotion logic 342 keeps a record or otherwise acquires information about translation lookaside buffer misses that is used for this check.

As yet another example of a promotion condition, in some embodiments, promotion logic 342 determines whether the prefetch request for prefetching the data is associated with high confidence by prefetcher 316. In these embodiments, prefetcher 316 associates confidence levels with prefetches, associating higher confidence levels to prefetches that prefetch data into L1 data cache 312 that is more likely to be useful (e.g., based on a data access pattern record, etc.). Promotion logic 342 keeps a record or otherwise acquires information (e.g., from prefetcher 316) about the confidence associated with prefetch requests for this check.

As yet another example of a promotion condition, in some embodiments, promotion logic 342 determines whether a prior-access record indicates that, when the same data was previously stored in L1 data cache 312, the data was loaded to a physical register. In these embodiments, promotion logic 342, L1 data cache 312, and/or another functional block keeps the prior-access record that is used for this check.

As yet another example of a promotion condition, in some embodiments, promotion logic 342 determines whether data in the cache block has previously been accessed by a load that blocks retirement. Generally, a load of data within a group of instructions can prevent younger instructions in the group of instructions from retiring. Promotion logic 342, retire unit 340, and/or another functional block can keep a record of loads that previously blocked retirement for performing this check.

As yet another example of a promotion condition, in some embodiments, promotion logic 342 determines whether data in the cache block is included in a pointer chasing sequence. In these embodiments, promotion logic 342 and/or another functional block can track, and may keep a record of, pointer loading sequences for performing this check.

As yet another example of a promotion condition, in some embodiments, promotion logic 342 determines whether a load that accesses data from the cache block is in a critical path. In these embodiments, a critical path is a path or sequence of instructions in program code that are considered critical for timing purposes. For example, an instruction sequence in an often-executed section of program code, etc. Promotion logic 342 and/or another functional block can keep a record that is used for tracking the cache blocks accessed in critical paths for performing this check.

As yet another example of a promotion condition, in some embodiments, promotion logic 342 determines whether a load that accesses data from the cache block is associated with a data structure with varying reuse distances. Generally, reuse distance is a measure representative of a number of cache blocks accessed between two accesses to a given cache block. A varying reuse distance is therefore a reuse distance that is not the same for a sequence of consecutive accesses of the given cache block. Promotion logic 342, L1 data cache 312, and/or another functional block can keep a record that is used for tracking data structure reuse distances for performing this check.

As yet another example of a promotion condition, in some embodiments, promotion logic 342 determines whether a specified rate of promotions or number of promotions has been exceeded. In these embodiments, promotion logic 342 or another functional block sets a maximum rate or number of promotions and then uses the rate or number of promotions to control/limit the number of promotions that are performed (i.e., separate promotions of data from portions of cache lines). For example, in some embodiments, promotion logic 342 or another functional block keeps a record of a proportion of promotions that result in useful data being promoted (i.e., promoted data that is eventually loaded, accessed by micro-operations, etc.) and dynamically increases a maximum rate of promotions when more useful data is being promoted—and decreases the maximum rate of promotions when less useful data is being promoted.

Returning to the checks performed by promotion logic 342, as described above, it is assumed that each of the checks in steps 702, 706, and 710 results in promotion logic 342 determining that prefetched data from a portion of the cache block is allowed to be promoted to a physical register (step 710). Promotion logic 342 therefore copies data from the portion of the cache block to the promotion register (step 712). In other words, promotion logic 342, based on the information about the portion from data loading record 410, acquires/reads prefetched data from an M-byte portion of an N-byte cache block and stores the prefetched data in the available promotion register 602, which is shown as promoted prefetched data 604 in FIG. 6. Recall that the N-byte cache block can be a 64 byte, 128 byte, or other-sized cache block (e.g., a cache line) and M-byte portion can be the same size (or smaller, if bit padding is used) than a size in bytes of the physical register, such as four bytes or another size.

Promotion logic 342 then updates data promotion record 606 to indicate that data from the portion of the cache block is available in the promotion register (step 714). For this operation, promotion logic 342 updates an entry 608 in data promotion record 606, shown as promotion entry 610, to include an identification of the portion of the cache block that was loaded to the promotion register as well as an identifier for the promotion register. In some embodiments, the particular information that is recorded in promotion entry 610 depends on the information that is available to promotion logic 342. For example, in some embodiments, promotion logic 342 uses information that is provided by prefetcher 316 and/or other functional blocks. In other words, in these embodiments, promotion logic 342 acquires information about the prefetched data from prefetcher 316 (as described above for step 700) and/or the other functional blocks. Promotion logic 342 then records information in promotion entry 610 that is, is based on, and/or is generated from the acquired information. Some examples of the information that promotion logic 342 records in promotion entry 610 are presented in the following paragraphs.

Figure 8:
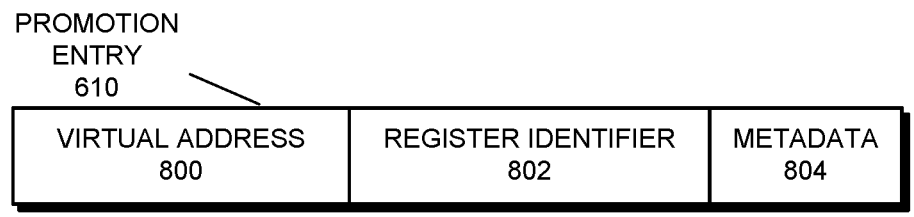
FIG. 8 presents a block diagram illustrating information recorded in a promotion entry in a data promotion record in accordance with some embodiments.

In some embodiments, prefetcher 316 prefetches data using and based on virtual addresses (i.e., byte addresses) associated with load micro-operations. In these embodiments, therefore, the information provided by prefetcher 316 to promotion logic 342 includes a virtual address that was used in prefetching the prefetched data. The information recorded to promotion entry 610 (and, more generally, entries 608) in these embodiments includes a virtual address for the portion of the cache block—or a value based thereon or computed therefrom—and an identifier such as a physical register number for the promotion register. FIG. 8 presents a block diagram illustrating information recorded in promotion entry 610 in accordance with some embodiments. As can be seen in FIG. 8, promotion entry 610 includes a virtual address 800 field that is used for storing a virtual address for the portion of the cache block or a value based thereon or computed therefrom. Promotion entry 610 also includes a register identifier 802 field that is used for storing an identifier for the promotion register to which the prefetched data was promoted. Promotion entry 610 additionally includes a metadata field 804 which stores information about the information recorded in promotion entry 610, such as a validity indicator, a timestamp, etc.

Figure 9:
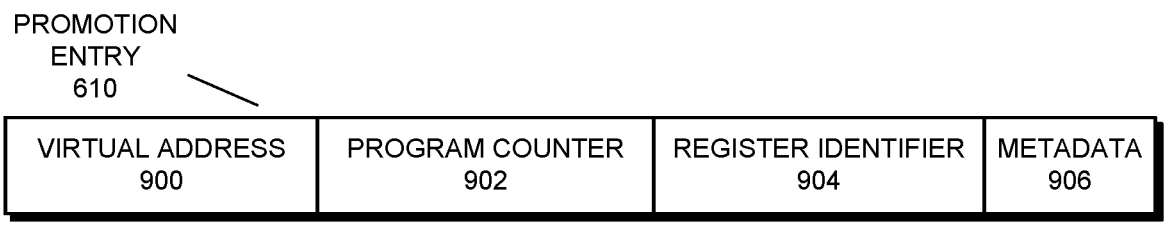
FIG. 9 presents a block diagram illustrating information recorded in a promotion entry in a data promotion record in accordance with some embodiments.

In some embodiments, prefetcher 316 prefetches data using and based on program counters associated with particular load micro-operations. In these embodiments, therefore, the information provided by prefetcher 316 to promotion logic 342 includes a program counter that was used in prefetching the prefetched data. Promotion logic 342 also acquires a virtual address associated with the prefetch from a functional block such as a scheduler. The information recorded to promotion entry 610 (and, more generally, entries 608) in these embodiments includes the program counter, a virtual address for the portion of the cache block—or a value based thereon or computed therefrom—and an identifier such as a physical register number for the promotion register. FIG. 9 presents a block diagram illustrating information recorded in promotion entry 610 in accordance with some embodiments. As can be seen in FIG. 9, promotion entry 610 includes a virtual address 900 field that is used for storing a virtual address for the portion of the cache block or a value based thereon or computed therefrom. Promotion entry 610 also includes a program counter 902 field that is used for storing a program counter that is associated with the prefetched data. Promotion entry 610 additionally includes a register identifier 904 field that is used for storing an identifier for the promotion register to which the prefetched data was promoted. Promotion entry 610 further includes a metadata field 906 which stores information about the information recorded in promotion entry 610, such as a validity indicator, a timestamp, etc.

In some embodiments, data promotion record 606 is organized and accessed in a similar way to cache memory. In other words, entries 608 in data promotion record 606 are organized and accessed using techniques and operations similar to other forms of cache memory—and data promotion record 606 itself can be considered a cache memory. For example, in some embodiments, data promotion record 606 is organized associatively (e.g., into ways and sets, etc.). In these embodiments, each entry 608 may include a tag or data promotion record 606 may include a tag array that includes tag information for performing lookups in data promotion record 606. In some embodiments, the tags are computed based on the above-described information (e.g., virtual addresses, program counters, and/or other information). For example, in embodiments in which promotion logic 342 has both a program counter and virtual address for promoted prefetched data, promotion logic 342 may compute a tag for entry 608 using the program counter and the virtual address—or respective portions thereof.

At the conclusion of the process in FIG. 7, prefetched data has been promoted from a portion of a cache block in L1 data cache 312 to a promotion register 602 among physical registers 404—and the prefetched data is therefore stored in the promotion register 602. In some embodiments, the promotion of the data happens automatically. Promotion logic 342 therefore promotes the data of its own accord—and without having received a request from another functional block. In other words, in some embodiments, no load micro-operation—or other micro-operation or instruction—is executed to cause promotion logic 342 to promote the data; the promotion is performed by circuitry in promotion logic 342.

Using Promoted Prefetched Data

Figure 10:
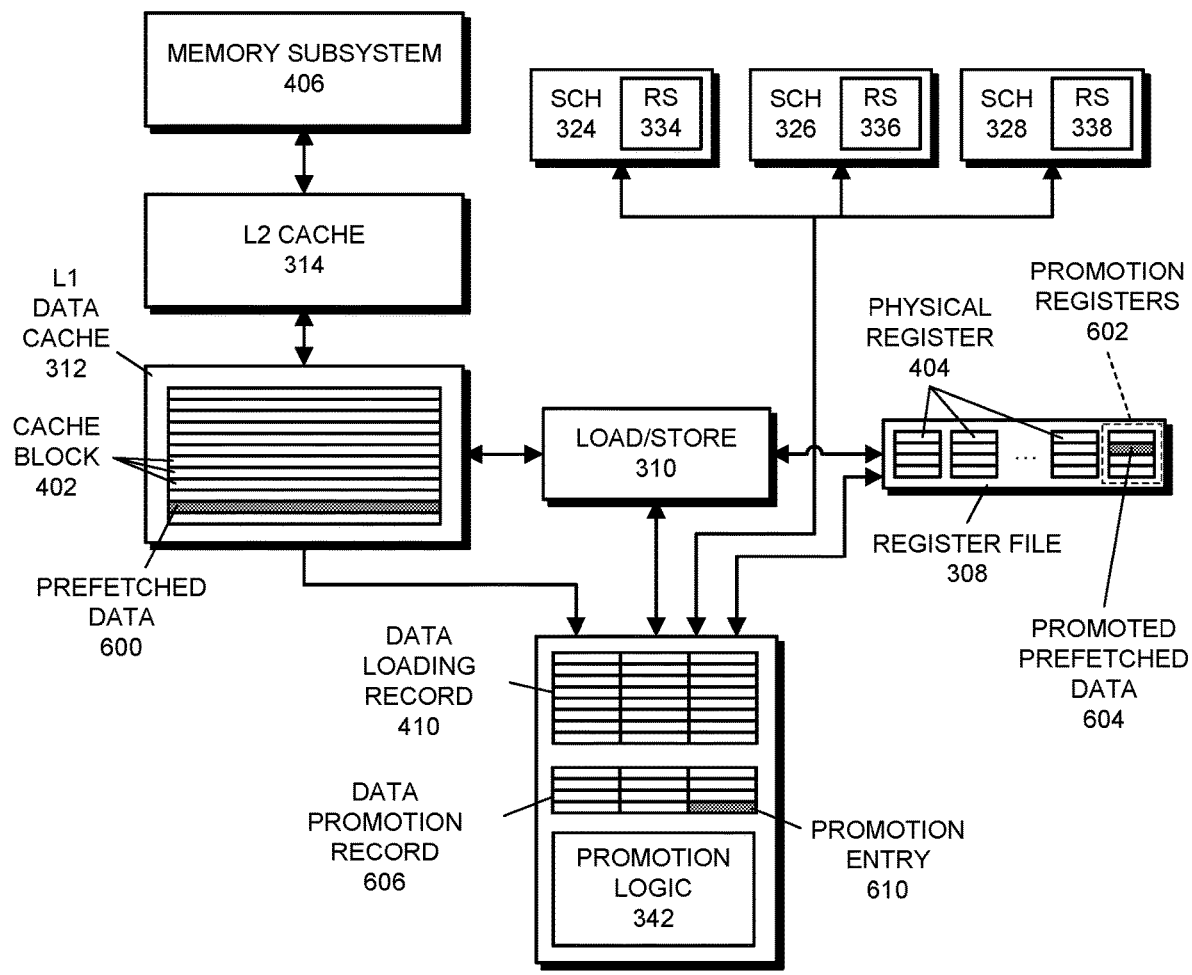
FIG. 10 presents a block diagram illustrating functional blocks that perform operations associated with using promoted prefetched data in accordance with some embodiments.
Figure 11:
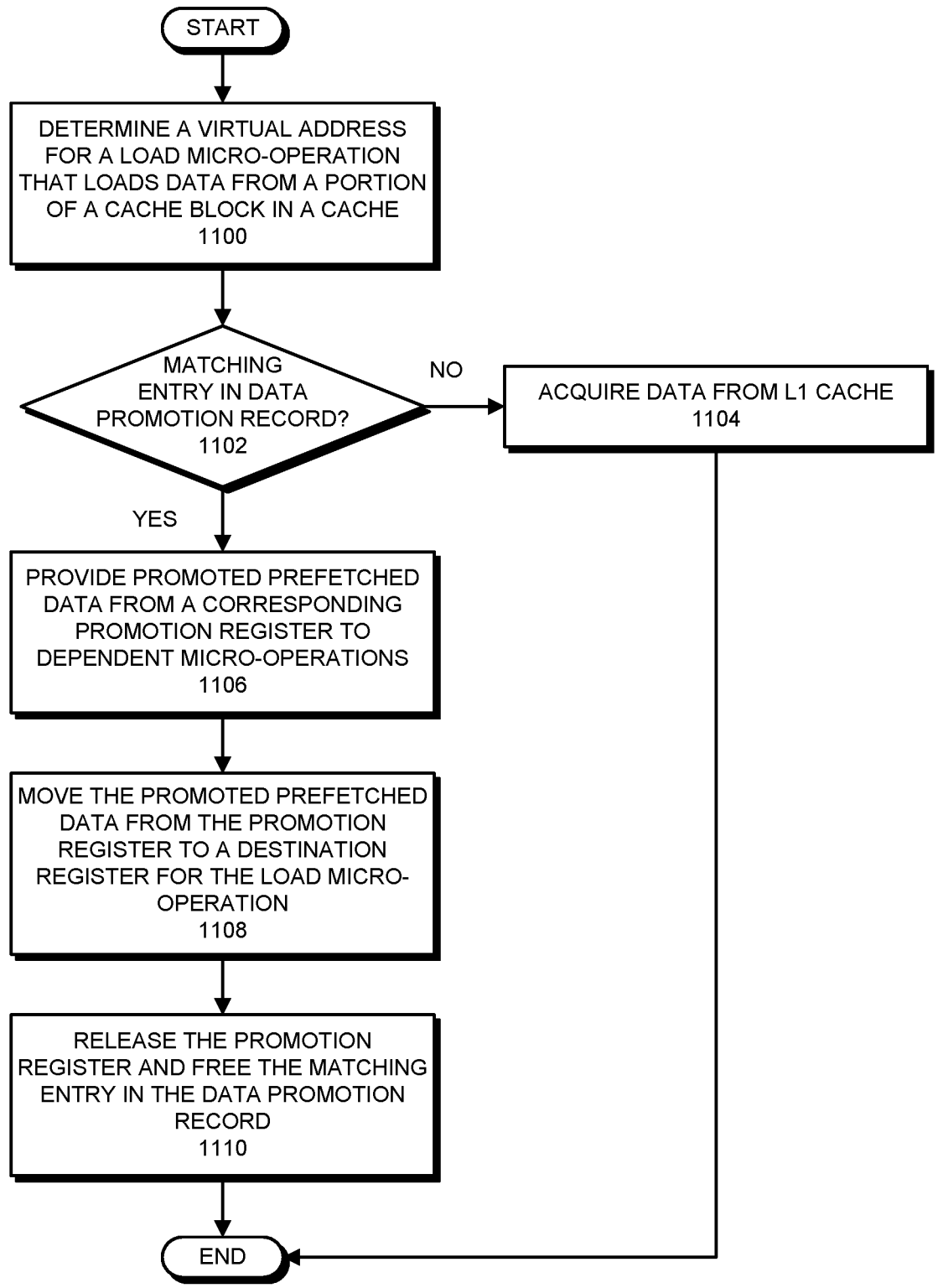
FIG. 11 presents a flowchart illustrating a process for using promoted prefetched data in accordance with some embodiments.

In the described embodiments, promotion logic 342 performs operations for using promoted prefetched data stored in promotion registers. In other words, after promoting prefetched data to a physical register from a portion of a cache block as shown in FIGS. 6-7, promotion logic 342 monitors subsequent load micro-operations to determine if and when a load micro-operation loads data from the same portion of the cache block. When such a load micro-operation is encountered, promotion logic 342 provides the promoted prefetched data to micro-operations that depend on the load micro-operation, thereby "using" the promoted prefetched data. FIG. 10 presents a block diagram illustrating functional blocks that perform operations associated with using promoted prefetched data in accordance with some embodiments. FIG. 11 presents a flowchart illustrating a process for using promoted prefetched data in accordance with some embodiments. FIGS. 10-11 are presented as general examples of functional blocks and operations performed by some embodiments. Some embodiments, however, include different functional blocks and/or different functional blocks perform the operations. In addition, some embodiments perform different operations and/or perform the operations in a different order.

In FIG. 10, the illustrated functional blocks include some of the functional blocks shown in FIGS. 2-4 and 6. Some of the functional blocks and labels in FIGS. 2-4 and 6, however, are not shown in FIG. 10 for clarity. Also, in FIG. 10, only a few of some figure elements (e.g., cache blocks 402, physical registers 404, etc.) are labeled for clarity. In addition, for the operation in FIGS. 10-11, it is assumed that the operations in FIGS. 6-7 have been performed and thus promoted prefetched data 604 is stored in a promotion register 602 as described for FIGS. 6-7.

The example in FIGS. 10-11 is of an embodiment in which promotion logic 342 uses an actual (i.e., computed, non-speculative, etc.) virtual address in operations for using promoted prefetched data. In some other embodiments, however, promotion logic 342 uses a predicted, or "speculative," virtual address in operations for using promoted prefetched data. In some other embodiments, alternatively, promotion logic 342 uses a program counter in combination with an actual or speculative virtual address in operations for using promoted prefetched data. The other embodiments, however, perform generally similar operations for using promoted prefetched data as those shown in FIGS. 10-11. Some examples of using promoted prefetched data based on speculative virtual addresses or program counters are presented below in FIGS. 13-15.

The process shown in FIG. 11 starts when promotion logic 342 determines a virtual address for a load micro-operation that loads data from a portion of a cache block 402 in L1 data cache 312 (step 1100). Turning to FIG. 10, this operation includes promotion logic 342 receiving, from one of schedulers 324-328 or another functional block, the virtual address for the load micro-operation. For the example in FIGS. 10-11, the load micro-operation is assumed to load data from a portion of prefetched data 600 that was previously promoted to a promotion register 602 in register file 308, promoted prefetched data 604. In other words, the load micro-operation loads promoted prefetched data 604 that promotion logic 342 earlier speculatively stored in the promotion register 602.

In some embodiments, the virtual address that promotion logic 342 receives in step 1100 is a byte address such as those that are used by software entities and/or hardware functional blocks for accessing memory. Generally, the virtual address is a local address that is to be translated to a physical address (e.g., using a translation lookaside buffer or a page table) before a memory access is performed using the physical address.

Promotion logic 342 then determines if data promotion record 606 has a matching entry (step 1102). For this operation, promotion logic 342 uses the virtual address (and possibly other information) to perform a lookup in data promotion record 606 to determine if an entry 608 in data promotion record 606 has information about promoted prefetched data that can be forwarded to dependent micro-operations (i.e., micro-operations that depend on the load micro-operation). For example, promotion logic 342 can compare the virtual address, a portion thereof, or a value computed therefrom to a value in a virtual address field in entries in the data promotion record 606. In some embodiments, data promotion record 606 is organized as a cache and this operation involves comparing a tag value computed from the virtual address (and possibly other information) to tags in at least some of the entries in data promotion record 606. As described above, it is assumed that promoted prefetched data 604 is a copy of the data that is loaded by the load micro-operation and data promotion record 606 therefore includes a promotion entry, promotion entry 610, that has information about promoted prefetched data that can be forwarded to the dependent micro-operations (step 1102). If there was not a matching entry in data promotion record 606, however, promotion logic 342 would not (and could not) forward promoted prefetched data. In this case, the data for the load micro-operation would be acquired from L1 data cache 312 using a typical load (step 1104). In other words, after load/store unit 310 executed the load micro-operation to load the data from L1 data cache 312 to a physical register 404, the loaded data would be provided to the dependent micro-operations.

If there was a matching entry in data promotion record 606, promotion logic 342 then provides the promoted prefetched data from the promotion register to dependent micro-operations (step 1106). For this operation, promotion logic 342 acquires, from promotion entry 610, an identifier for the promotion register 602 in which promoted prefetched data 604 is stored. Promotion logic 342 then reads the promoted prefetched data 604 from the promotion register 602. Promotion logic 342 next broadcasts the promoted prefetched data 604 to reservation stations 334-338. In reservation stations 334-338, the broadcast promoted prefetched data is provided to any existing micro-operations that are dependent on the load micro-operation.

In some embodiments, when broadcasting the promoted prefetched data to the reservation stations, the promotion logic 342 does not identify the promotion register 602 in which the promoted prefetched data is actually stored, but instead identifies the destination register that is assigned to the load micro-operation. By doing this, these embodiments ensure that the promoted prefetched data will be forwarded from promotion logic 342 to the correct dependent micro-operations. In some of these embodiments, promotion logic 342 acquires the identifier for the physical register that is assigned to the load micro-operation from rename unit 330 (not shown in FIG. 10).

In some embodiments, in addition to providing the promoted prefetched data from the promotion register 602, promotion logic 342 or another functional block moves the data from the promotion register to the destination register for the load micro-operation (step 1108). The promotion logic 342 does this in order to make the promoted prefetched data available in the physical register 404 for subsequent dependent micro-operations—including dependent micro-operations that have not yet been dispatched. In this way, promotion logic 342 avoids the need for changing the register dependencies for the dependent micro-operations or register mapping logic in rename unit 330 so that the dependent micro-operations and/or the rename unit 330 uses the promotion register 602. In some embodiments, however, promotion logic 342 changes the register dependencies for the dependent micro-operations and/or the register mapping logic in rename unit 330 so that the dependent micro-operations and/or the rename unit 330 uses the promotion register 602.

Promotion logic 342 next releases the promotion register and frees the matching entry 608 in data promotion record 606 (step 1110). For this operation, promotion logic 342 deletes the promoted prefetched data 604 from the respective promotion register and/or marks the respective promotion register as invalid/available (e.g., via metadata) to enable the storage of other data in the promotion register. Promotion logic 342 also marks promotion entry 610 as available for storing information about subsequently promoted prefetched data (e.g., sets an invalid or available bit in metadata for promotion entry 610).

Although an embodiment is described in which promoted prefetched data 604 is removed from the respective promotion register 602, in some embodiments, promoted prefetched data 604 is not removed from the respective promotion register 602. For example, in some embodiments, promotion logic 342 changes the register dependencies for the dependent micro-operations and/or the register mapping logic in rename unit 330 so that the dependent micro-operations and/or the rename unit 330 uses the promotion register 602. In these embodiments, however, the matching entry 608 in data promotion record 606 may be freed in order to enable the entry 608 to be used for promoted prefetched data in other promotion registers.

Load-Use Latency when Using Promoted Prefetched Data Based on Virtual Addresses

Figure 12:
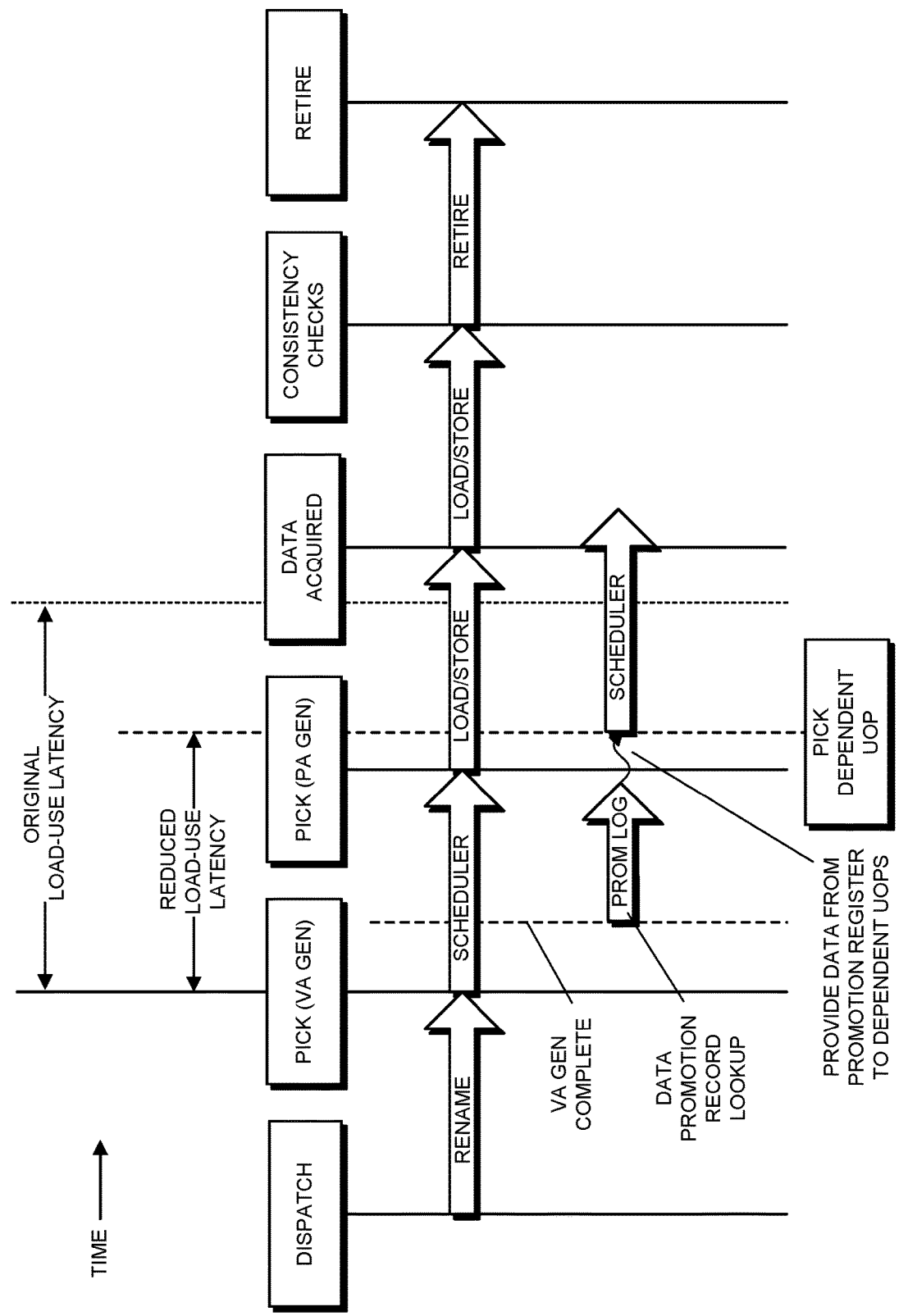
FIG. 12 presents a timeline diagram illustrating a load-use latency when using promoted prefetched data based on virtual addresses in accordance with some embodiments.

In the described embodiments, a reduced load-use latency (in comparison to existing processors) is achieved for load micro-operations because promotion logic 342 provides promoted prefetched data to dependent micro-operations (i.e., micro-operations that depend on the load micro-operations). In some embodiments, entries 608 in data promotion record 606 are accessed using actual/computed virtual address information. In these embodiments, therefore, promotion logic 342 uses actual/generated virtual addresses for accessing data promotion record 606 and thereby providing promoted prefetched data to the dependent micro-operations. FIG. 12 presents a timeline diagram illustrating a load-use latency when using promoted prefetched data based on virtual addresses in accordance with some embodiments. FIG. 12 is presented as a general example of operations performed by some embodiments. Some embodiments, however, perform different operations or perform the operations in a different order. In addition, although a number of functional block labels, i.e., rename, scheduler, etc., are shown in order to provide an illustration of functional blocks in core 300 (i.e., rename unit 330, schedulers 324-328, etc.) in which operations may occur, in some embodiments, different functional blocks perform the operations.

For the example in FIG. 12, time, and thus the timeline, runs from left to right. Also, for the example in FIG. 12, it is assumed that promoted prefetched data was earlier/previously promoted to a promotion register 602. For example, in some embodiments, the promoted prefetched data is promoted using operations such as those shown in FIGS. 6-7. In addition, for the example in FIG. 12, it is assumed that a data promotion record 606 is accessed using virtual address information such as the embodiment shown in FIG. 8.

Prior to the operations shown in FIG. 12, fetch/decode unit 318 fetches a macro-instruction from L1 instruction cache 320 and decodes the macro-instruction into a load micro-operation (and possibly other micro-operations). Generally, the load micro-operation, when executed in load/store unit 310, causes load/store unit 310 to load data from L1 data cache 312 to a physical register 404. Fetch/decode unit 318 forwards the load micro-operation to dispatch 322 and dispatch 322 dispatches the load micro-operation to rename unit 330, as shown via the label DISPATCH. Rename unit 330 assigns physical registers (i.e. physical registers 404) to be used in place of the architectural registers identified in the load micro-operation. Rename unit 330 then forwards the load micro-operation to a scheduler functional block (scheduler 324 for the example in FIG. 12) to be finally prepared for execution. Picker logic in scheduler 324 next schedules the load micro-operation to address generation unit 306 to compute a virtual address from which the load micro-operation is to load data, as shown via the label PICK (VA GEN).

While the operations for preparing the load micro-operation for execution and executing the load micro-operation then continue as described below, promotion logic 342 (PROM LOG) acquires the virtual address from the address generation unit 306. Promotion logic 342 then uses the virtual address in an attempt to provide promoted prefetched data to dependent micro-operations (i.e., micro-operations that depend on the load micro-operation). For this operation, promotion logic 342 uses the virtual address to perform a lookup in data promotion record 606 to determine whether the load micro-operation loads data from a portion of a cache block from which data was previously promoted into a promotion register 602. For example, promotion logic 342 may generate a tag or index based the virtual address (or a portion thereof) and then use the tag or index to search entries in data promotion record 606 for a matching entry. For the example in FIG. 12, it is assumed that promotion entry 610 in data promotion record 606 includes a record of such promoted prefetched data—i.e., includes a record identifying promoted prefetched data 604.

Promotion logic 342 then provides promoted prefetched data 604 to the dependent micro-operations. This operation includes acquiring promoted prefetched data 604 from the respective promotion register 602 in the register file 308 and then broadcasting promoted prefetched data 604 to reservation stations 334-338. Upon receiving promoted prefetched data 604, each reservation station adds promoted prefetched data 604 to dependent micro-operations and then forwards the dependent micro-operations to a respective execution unit for execution when the dependent micro-operations are otherwise ready for execution. In addition, in some embodiments, promotion logic 342 moves or copies promoted prefetched data 604 from the respective promotion register 602 to a destination physical register 404 for the load micro-operation. Moving or copying promoted prefetched data 604 ensures that subsequent/younger micro-operations that use the data loaded by the load micro-operation in the destination physical register 404 for the load micro-operation can access the promoted prefetched data 604 in the expected physical register 404. In some embodiments in which promoted prefetched data 604 is not moved or copied, functional blocks that use the data loaded by the load micro-operation are re-directed to the respective promotion register, such as by updating the corresponding information in rename unit 330, etc.

As can be seen in FIG. 12 by the difference in time between the original load-use latency (as described above for FIG. 1) and the reduced load-use latency, by using promoted prefetched data, these embodiments can significantly decrease the load-use latency. In some embodiments, the reduced load-use latency is multiple cycles of a controlling clock shorter than the original load-use latency. In other words, existing processors (or processor cores) that execute load micro-operations using operations akin to those shown in FIG. 1 can take multiple cycles of a controlling clock longer to commence execution of dependent micro-operations than core 300, which can use promoted prefetched data to more quickly commence execution of dependent micro-operations.

As described above, in some embodiments, the operations for preparing the load micro-operation for execution and executing the load micro-operation are continued while promotion logic 342 provides promoted prefetched data 604 to the dependent micro-operations. These operations are continued in order to ensure that the load micro-operation executes properly and that the load micro-operation is processed in core 300 so that the architectural state of core 300 is kept current. In the event that the load micro-operation does not execute properly, core 300 performs corrective operations such as flushing micro-operations that began processing subsequent to the load micro-operation and replaying/re-executing the load micro-operation and the subsequent micro-operations.

As can be seen in FIG. 12, the operations for preparing the load micro-operation for execution following the generation of the virtual address include the picker logic in scheduler 324 scheduling the load micro-operation onto an address generation unit 306 to translate the virtual address into a physical address (via a translation lookaside buffer lookup or a page table search), as shown via the label PICK (PA GEN). The scheduler 324 then forwards the load micro-operation with the physical address to load/store unit 310 for execution. Executing the load micro-operation causes load/store unit 310 to acquire the data at the physical address from L1 data cache 312, as shown via the label DATA ACQUIRED (the data is assumed to be present in L1 data cache 312). For the embodiments shown in FIG. 12, however, the data is not stored in a destination register for the load micro-operation, but is instead discarded after being used for checking the promoted prefetched data. The data for the load micro-operation is discarded because the data for the load micro-operation is already present in the destination register—having been moved or copied there from a promotion register by promotion logic 342. The load/store unit 310 then performs one or more consistency checks to ensure that the load micro-operation executed properly, as shown via the label CONSISTENCY CHECKS (it is assumed that the load micro-operation executed properly based on the memory ordering model). Load/store unit 310 next forwards the completed load micro-operation to retire unit 340 where the load micro-operation is eventually retired, as shown via the label RETIRE.

In some embodiments, promotion logic 342 (and/or another functional block) performs checks to ensure a match between promoted prefetched data 604 and the data loaded by the micro-operation. This operation is performed to ensure that the dependent micro-operations that were supplied with promoted prefetched data 604 did not use incorrect data. In these embodiments, in the event that a mismatch is found between promoted prefetched data 604 and the data loaded by the micro-operation, promotion logic 342 performs corrective operations such as causing core 300 to flush micro-operations that began processing subsequent to the load micro-operation and replaying/re-executing the load micro-operation and the subsequent micro-operations.

Note that, in contrast to what is shown in FIG. 12, when there is no promoted prefetched data available for a load micro-operation, the data promotion record lookup fails and the load micro-operation is executed to acquire the data to be provided to micro-operations that depend on a load micro-operation. In other words, when there is no promoted prefetched data in a promotion register 602 to be provided to dependent micro-operations, core 300 executes the load micro-operation to load data to a physical register 404 and provide the data to the dependent micro-operations.

Figure 13:
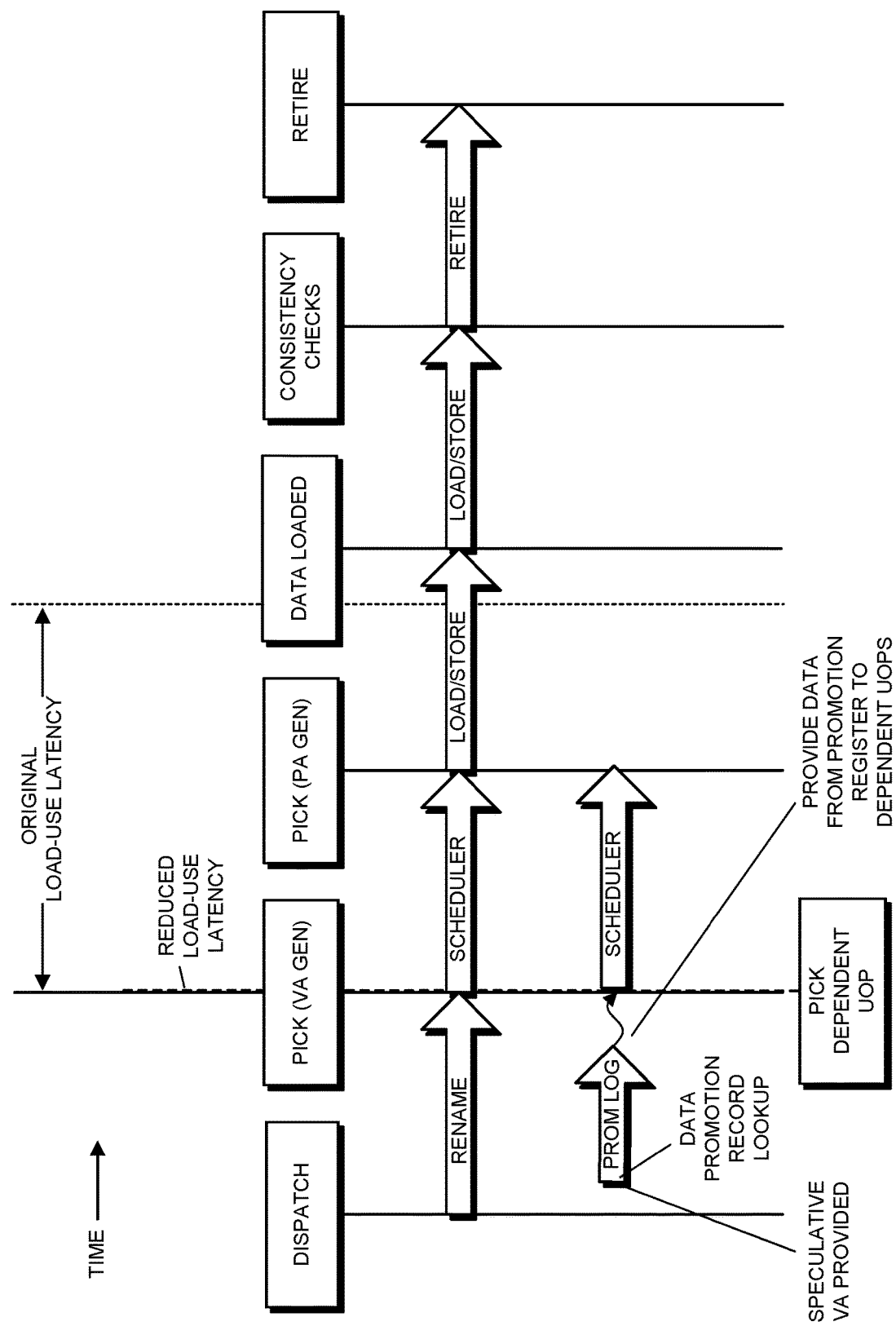
FIG. 13 presents a timeline diagram illustrating a load-use latency when using promoted prefetched data based on speculative virtual addresses in accordance with some embodiments.

Load-Use Latency when Using Promoted Prefetched Data based on Speculative Virtual Addresses In the described embodiments, a reduced load-use latency (in comparison to existing processors) is achieved for load micro-operations because promotion logic 342 provides promoted prefetched data to dependent micro-operations (i.e., micro-operations that depend on the load micro-operations). In some embodiments, entries 608 in data promotion record 606 are accessed using speculative virtual address information. In these embodiments, therefore, promotion logic 342 uses speculative virtual addresses for accessing data promotion record 606 and thereby providing promoted prefetched data to the dependent micro-operations. FIG. 13 presents a timeline diagram illustrating a load-use latency when using promoted prefetched data based on speculative virtual addresses in accordance with some embodiments. FIG. 13 is presented as a general example of operations performed by some embodiments. Some embodiments, however, perform different operations or perform the operations in a different order. In addition, although a number of functional block labels, i.e., rename, scheduler, etc., are shown in order to provide an illustration of functional blocks in core 300 (i.e., rename unit 330, schedulers 324-328, etc.) in which operations may occur, in some embodiments, different functional blocks perform the operations.

For the example in FIG. 13, time, and thus the timeline, runs from left to right. Also, for the example in FIG. 13, it is assumed that promoted prefetched data was earlier/previously promoted to a promotion register 602. For example, in some embodiments, the promoted prefetched data is promoted using operations such as those shown in FIGS. 6-7. In addition, for the example in FIG. 13, it is assumed that a data promotion record 606 is accessed using virtual address information such as the embodiment shown in FIG. 8.

Prior to the operations shown in FIG. 13, fetch/decode unit 318 fetches a macro-instruction from L1 instruction cache 320 and decodes the macro-instruction into a load micro-operation (and possibly other micro-operations). Generally, the load micro-operation, when executed in load/store unit 310, causes load/store unit 310 to load data from L1 data cache 312 to a physical register 404. Fetch/decode unit 318 forwards the load micro-operation to dispatch 322.

Before the load micro-operation dispatched from dispatch 322, a virtual address prediction functional block (not shown) in fetch/decode unit 318 or another functional block (e.g., promotion logic 342, etc.) receives information that is to be used for predicting a speculative virtual address. For example, in some embodiments, the virtual address prediction functional block receives, from program counter 344 or another functional block, a program counter associated with the above-described macro-instruction. The virtual address prediction functional block then uses the received information to predict the speculative virtual address. Continuing the example, in some embodiments, the virtual address prediction functional block (or another functional block) keeps a record in which program counters for load micro-operations are associated with virtual addresses—e.g., virtual addresses that were previously computed for the load micro-operations. The virtual address prediction functional block can therefore perform a lookup in the record for a virtual address that is associated with the program counter. When the speculative virtual address is ready, the virtual address prediction functional block provides the speculative virtual address to promotion logic 342 (PROM LOG) and possibly other functional blocks.

Promotion logic 342 then uses the speculative virtual address in an attempt to provide promoted prefetched data to dependent micro-operations (i.e., micro-operations that depend on the load micro-operation). For this operation, promotion logic 342 uses the speculative virtual address to perform a lookup in data promotion record 606 to determine whether the load micro-operation loads data from a portion of a cache block from which data was previously promoted into a promotion register 602. For example, promotion logic 342 may generate a tag or index based the speculative virtual address (or a portion thereof) and then use the tag or index to search entries in data promotion record 606 for a matching entry. For the example in FIG. 13, it is assumed that promotion entry 610 in data promotion record 606 includes a record of such promoted prefetched data—i.e., promoted prefetched data 604.

Promotion logic 342 then provides promoted prefetched data 604 to the dependent micro-operations. This operation includes communicating with rename unit 330 to obtain a mapping between a destination architectural register of the load micro-operation and a physical register that is allocated for use as the load micro-operation's destination register by the rename unit 330. The promotion logic 342 uses the destination physical register identifier to broadcast the promoted prefetched data to the dependent micro-operations. Promoted prefetched data 604 is obtained by reading register file 308 using the physical register identifier provided by promotion logic 342 for the respective promotion register 602 thereby directing the load micro-operation—and eventually the dependent micro-operations—to the respective promotion register 602.

As can be seen in FIG. 13 by the difference in time between the original load-use latency (as described above for FIG. 1) and the reduced load-use latency, by using promoted prefetched data, these embodiments can significantly decrease the load-use latency. In some embodiments, the reduced load-use latency is near zero cycles of a controlling clock—and is multiple cycles of a controlling clock shorter than the original load-use latency. In other words, existing processors (or processor cores) that execute load micro-operations using operations akin to those shown in FIG. 1 can take multiple cycles of a controlling clock longer to commence execution of dependent micro-operations than core 300, which can use promoted prefetched data to more quickly commence execution of dependent micro-operations. In addition, the speculative virtual address can be available sooner than the corresponding computed/actual virtual address. The data promotion record lookup and providing promoted prefetched data can therefore occur sooner in embodiments that use speculative virtual addresses than in embodiments in which computed/actual virtual addresses are used (such as the embodiments that are shown in FIG. 12). The reduced load-use latency in embodiments that use speculative virtual addresses is consequently shorter than the reduced load-use latency in embodiments that use computed/actual virtual addresses.

As described above, in some embodiments, the operations for preparing the load micro-operation for execution and executing the load micro-operation are continued while promotion logic 342 provides promoted prefetched data 604 to the dependent micro-operations. These operations are continued in order to ensure that the load micro-operation executes properly and that the load micro-operation is processed in core 300 so that the architectural state of core 300 is kept current. In the event that the promoted prefetched data 604 broadcasted to the dependent micro-operations was incorrect, core 300 performs corrective operations such as flushing micro-operations that began processing subsequent to the load micro-operation and replaying/re-executing the load micro-operation and the subsequent micro-operations As can be seen in FIG. 13, the operations for preparing the load micro-operation for execution include dispatch 322 dispatching the load micro-operation to rename unit 330, as shown via the label DISPATCH. Rename unit 330 then assigns physical registers (i.e. physical registers 404) to be used in place of the destination architectural registers identified in the load micro-operation. Recall that promotion logic 342 already updated the register file 308 with the value of the respective promotion register 602 in which promoted prefetched data 604 is stored. The physical destination register assigned to the load micro-operation needs to obtain data from the respective promotion register 602 in which promoted prefetched data 604 is stored. Because promoted prefetched data 604 is already present in the respective physical register, register file 308 (or another functional block) immediately broadcasts promoted prefetched data 604 to reservation stations 334-338 using the physical destination register identifier assigned to the load micro-operation. Rename unit 330 then forwards the load micro-operation to a scheduler functional block (scheduler 324 for the example in FIG. 13) to be finally prepared for execution. Picker logic in scheduler 324 next issues the load micro-operation to an address generation unit 306 to compute a virtual address from which the load micro-operation is to load data, as shown via the label PICK (VA GEN). Load store unit 310 logic then picks the load micro-operation to translate the virtual address into a physical address (via a translation lookaside buffer lookup or a page table search), as shown via the label PICK (PA GEN). Load/store unit 310 then executes the load micro-operation, which causes load/store unit 310 to acquire the data at the physical address from L1 data cache 312 (the data is assumed to be present in L1 data cache 312). Load/store unit 310 then stores the acquired data in the destination physical register 404 for the load micro-operation, as shown via the label DATA LOADED. The load/store unit 310 then performs one or more consistency checks to ensure that the load micro-operation executed properly based on the memory ordering model, as shown via the label CONSISTENCY CHECKS (it is assumed that the load micro-operation executed properly). Load/store unit 310 next forwards the completed load micro-operation to retire unit 340 where the load micro-operation is eventually retired, as shown via the label RETIRE.

In some embodiments, after scheduler 324 computes the virtual address for the load micro-operation, promotion logic 342 (and/or another functional block) performs checks to ensure a match between the speculative virtual address and the virtual address. This operation is performed to ensure that the predicted speculative virtual address matches the virtual address that is used for the load micro-operation. In some of these embodiments, promotion logic 342 retains the speculative virtual address so that this check can be performed. In the event that a mismatch is found between the speculative virtual address and the virtual address, promotion logic 342 performs corrective operations such as causing core 300 to flush micro-operations that began processing subsequent to the load micro-operation and replaying/re-executing the load micro-operation and the subsequent micro-operations.

In some embodiments, promotion logic 342 (and/or another functional block) performs checks to ensure a match between promoted prefetched data 604 and the data loaded by the load micro-operation. This operation is performed to ensure that the dependent micro-operations that were supplied with promoted prefetched data 604 did not use incorrect data. In these embodiments, in the event that a mismatch is found between promoted prefetched data 604 and the data loaded by the micro-operation, promotion logic 342 performs corrective operations such as causing core 300 to flush micro-operations that began processing subsequent to the load micro-operation and replaying/re-executing the load micro-operation and the subsequent micro-operations.

Note that, in contrast to what is shown in FIG. 13, when there is no promoted prefetched data available for a load micro-operation, the data promotion record lookup fails and the load micro-operation is executed to acquire the data to be provided to micro-operations that depend on a load micro-operation. In other words, when there is no promoted prefetched data in a promotion register 602 to be provided to dependent micro-operations, core 300 executes the load micro-operation to load data to a physical register 404 and provide the data to the dependent micro-operations.

Figure 14:
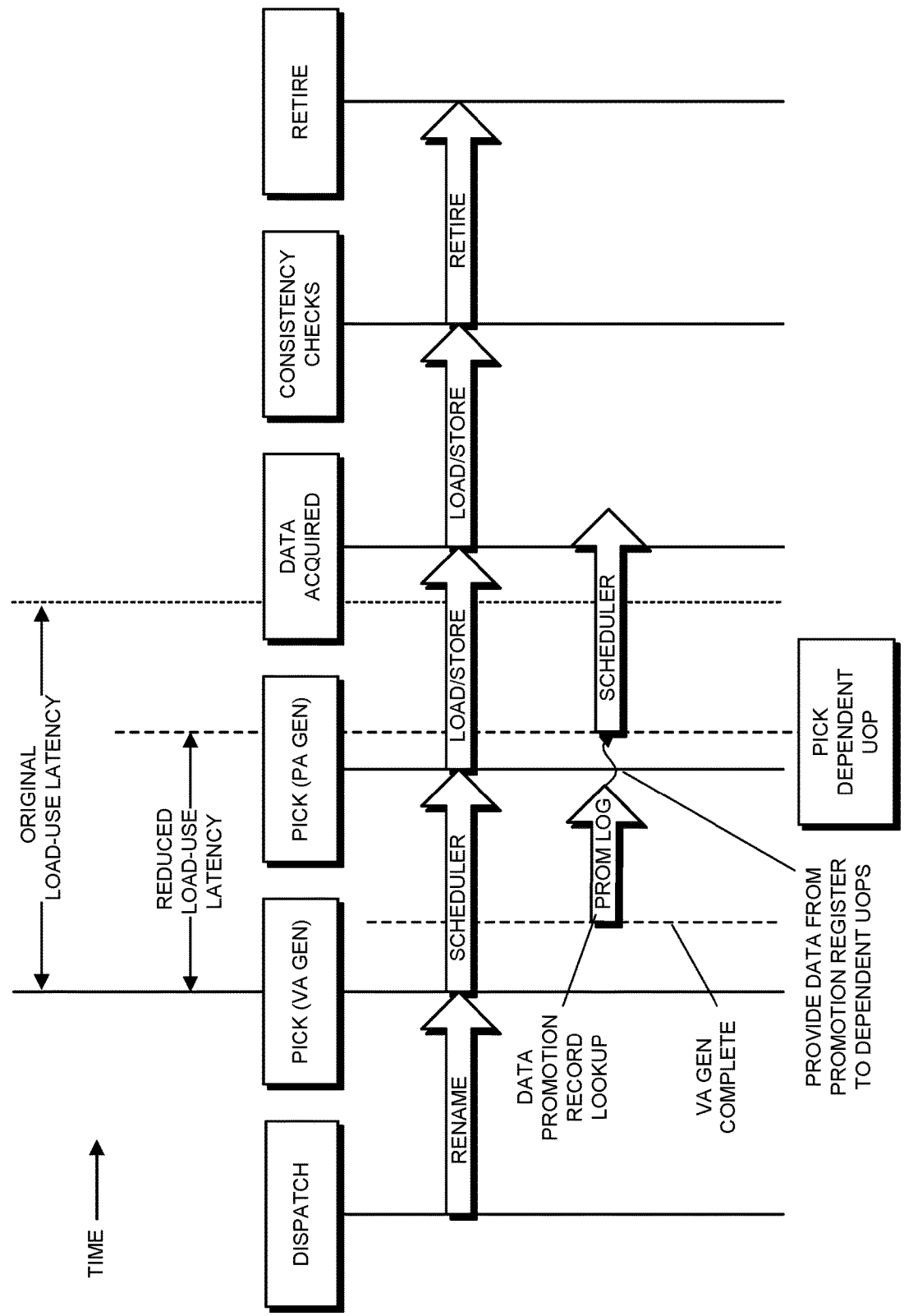
FIG. 14 presents a timeline diagram illustrating a load-use latency when using promoted prefetched data based on program counters and virtual addresses in accordance with some embodiments.

Load-Use Latency when Using Promoted Prefetched Data based on Program Counters and Virtual Addresses In the described embodiments, a reduced load-use latency (in comparison to existing processors) is achieved for load micro-operations because promotion logic 342 provides promoted prefetched data to dependent micro-operations (i.e., micro-operations that depend on the load micro-operations). In some embodiments, entries 608 in data promotion record 606 are accessed using a program counter and virtual address information. In these embodiments, therefore, promotion logic 342 uses program counters along with actual/generated virtual addresses for accessing data promotion record 606 and thereby providing promoted prefetched data to the dependent micro-operations. FIG. 14 presents a timeline diagram illustrating a load-use latency when using promoted prefetched data based on program counters and virtual addresses in accordance with some embodiments. FIG. 14 is presented as a general example of operations performed by some embodiments. Some embodiments, however, perform different operations or perform the operations in a different order. In addition, although a number of functional block labels, i.e., rename, scheduler, etc., are shown in order to provide an illustration of functional blocks in core 300 (i.e., rename unit 330, schedulers 324-328, etc.) in which operations may occur, in some embodiments, different functional blocks perform the operations.

For the example in FIG. 14, time, and thus the timeline, runs from left to right. Also, for the example in FIG. 14, it is assumed that certain prefetched data was earlier/previously promoted to a promotion register. For example, in some embodiments, the prefetched data is promoted using operations such as those shown in FIGS. 6-7. In addition, for the example in FIG. 14, it is assumed that a data promotion record 606 is accessed using program counter information and virtual addresses such as the embodiment shown in FIG. 9.

Prior to the operations shown in FIG. 14, fetch/decode unit 318, based at least in part on a program counter received from program counter 344, fetches a macro-instruction from L1 instruction cache 320 and decodes the macro-instruction into a load micro-operation (and possibly other micro-operations). Generally, the load micro-operation, when executed in load/store unit 310, causes load/store unit 310 to load data from L1 data cache 312 to a physical register 404. Fetch/decode unit 318 forwards the load micro-operation to dispatch 322 and dispatch 322 dispatches the load micro-operation to rename unit 330, as shown via the label DISPATCH. Rename unit 330 assigns physical registers (i.e. physical registers 404) to be used in place of the architectural registers identified in the load micro-operation. Rename unit 330 then forwards the load micro-operation to a scheduler functional block (scheduler 324 for the example in FIG. 14) to be finally prepared for execution. Picker logic in scheduler 324 next issues the load micro-operation to an address generation unit 306 to compute a virtual address from which the load micro-operation is to load data, as shown via the label PICK (VA GEN).

While the operations for preparing the load micro-operation for execution and executing the load micro-operation then continue as described below, promotion logic 342 (PROM LOG) acquires the virtual address from the picker logic. Promotion logic 342 also acquires the program counter from the picker logic (or another functional block). Promotion logic 342 then uses the virtual address and the program counter in an attempt to provide promoted prefetched data to dependent micro-operations (i.e., micro-operations that depend on the load micro-operation). For this operation, promotion logic 342 uses the virtual address and the program counter to perform a lookup in data promotion record 606 to determine whether the load micro-operation loads data from a portion of a cache block from which data was previously promoted into a promotion register 602. For example, promotion logic 342 may generate a tag or index based on a combination of the virtual address and the program counter (or respective portions thereof) and then use the tag or index to search entries in data promotion record 606 for a matching entry. For the example in FIG. 14, it is assumed that promotion entry 610 in data promotion record 606 includes a record of such promoted prefetched data—i.e., promoted prefetched data 604.

Promotion logic 342 then provides promoted prefetched data 604 to the dependent micro-operations. This operation includes acquiring promoted prefetched data 604 from the respective promotion register 602 in register file 308 and then broadcasting promoted prefetched data 604 to reservation stations 334-338 using the physical register 404 identifier assigned to the destination architectural register of the load micro-operation. Upon receiving promoted prefetched data 604, each reservation station adds promoted prefetched data 604 to dependent micro-operations and then forwards the dependent micro-operations to a respective execution unit for execution when the dependent micro-operations are otherwise ready for execution. In addition, in some embodiments, promotion logic 342 moves or copies promoted prefetched data 604 from the respective promotion register 602 to a destination physical register 404 for the load micro-operation. Moving or copying promoted prefetched data 604 ensures that subsequent/younger micro-operations that use the data loaded by the load micro-operation in the destination physical register 404 for the load micro-operation can access the data in the expected physical register 404. In some embodiments in which promoted prefetched data 604 is not moved or copied, functional blocks that use the data loaded by the load micro-operation are re-directed to the respective promotion register, such as by updating the corresponding information in rename unit 330, etc.

As can be seen in FIG. 14 by the difference in time between the original load-use latency (as described above for FIG. 1) and the reduced load-use latency, by using promoted prefetched data, these embodiments can significantly decrease the load-use latency. In some embodiments, the reduced load-use latency is multiple cycles of a controlling clock shorter than the original load-use latency. In other words, existing processors (or processor cores) that execute load micro-operations using operations akin to those shown in FIG. 1 can take multiple cycles of a controlling clock longer to commence execution of dependent micro-operations than core 300, which can use promoted prefetched data to more quickly commence execution of dependent micro-operations.

As described above, in some embodiments, the operations for preparing the load micro-operation for execution and executing the load micro-operation are continued while promotion logic 342 provides promoted prefetched data 604 to the dependent micro-operations. These operations are continued in order to ensure that the load micro-operation executes properly and that the load micro-operation is processed in core 300 so that the architectural state of core 300 is kept current. In the event that the load micro-operation does not execute properly, core 300 performs corrective operations such as flushing micro-operations that began processing subsequent to the load micro-operation and replaying/re-executing the load micro-operation and the subsequent micro-operations.

As can be seen in FIG. 14, the operations for preparing the load micro-operation for execution following the generation of the virtual address include the picker logic in load store unit 310 translating the virtual address into a physical address (via a translation lookaside buffer lookup or a page table search), as shown via the label PICK (PA GEN). Load store unit 310 then executes the load micro-operation, which causes load/store unit 310 to acquire the data at the physical address from L1 data cache 312, as shown via the label DATA ACQUIRED (the data is assumed to be present in L1 data cache 312). For the embodiments shown in FIG. 14, however, the data is not always stored in a destination register for the load micro-operation, but may instead be discarded after validating promoted prefetched data 604. The data for the load micro-operation is discarded only if the correct data for the load micro-operation is already present in the destination register—having been moved or copied there from a promotion register by promotion logic 342. The load/store unit 310 then performs one or more memory consistency checks to ensure that the load micro-operation executed without violating the memory ordering model, as shown via the label CONSISTENCY CHECKS (it is assumed that the load micro-operation executed properly). Load/store unit 310 next forwards the completed load micro-operation to retire unit 340 where the load micro-operation is eventually retired, as shown via the label RETIRE.

In some embodiments, promotion logic 342 (and/or another functional block) performs checks to ensure a match between promoted prefetched data 604 and the data loaded by the micro-operation. This operation is performed to ensure that the dependent micro-operations that were supplied with promoted prefetched data 604 did not use incorrect data. In these embodiments, in the event that a mismatch is found between promoted prefetched data 604 and the data loaded by the micro-operation, promotion logic 342 performs corrective operations such as causing core 300 to flush micro-operations that began processing subsequent to the load micro-operation and replaying/re-executing the load micro-operation and the subsequent micro-operations.

Note that, in contrast to what is shown in FIG. 14, when there is no promoted prefetched data available for a load micro-operation, the data promotion record lookup fails and the load micro-operation is executed to acquire the data to be provided to micro-operations that depend on a load micro-operation. In other words, when there is no promoted prefetched data in a promotion register 602 to be provided to micro-operations that depend on the load micro-operation, core 300 executes the load micro-operation to load data to a physical register 404 and provide the data to the dependent micro-operations.

Figure 15:
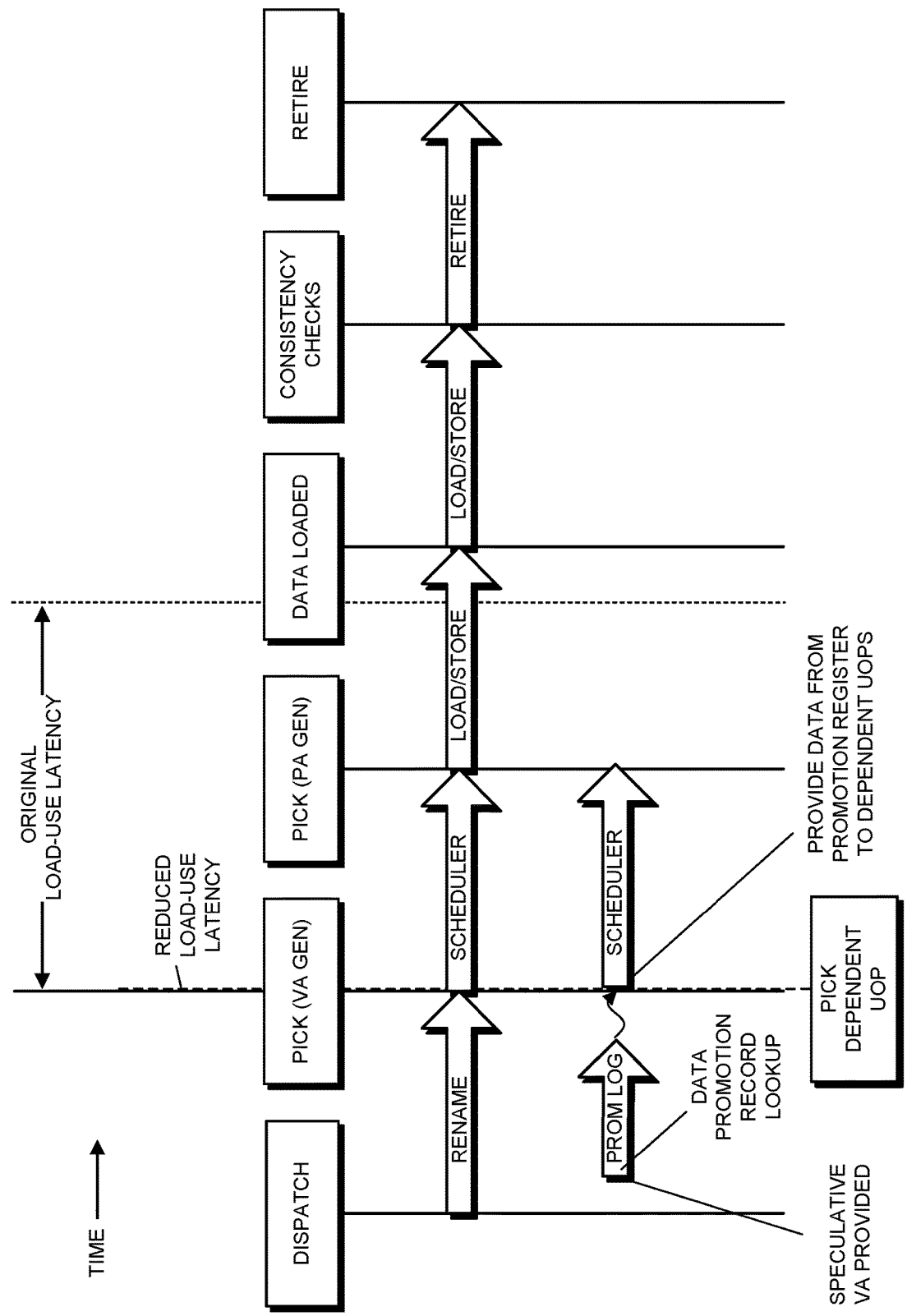
FIG. 15 presents a timeline diagram illustrating a load-use latency when using promoted prefetched data based on program counters and speculative virtual addresses in accordance with some embodiments.

Load-Use Latency when Using Promoted Prefetched Data based on Program Counters and Speculative Virtual Addresses In the described embodiments, a reduced load-use latency (in comparison to existing processors) is achieved for load micro-operations because promotion logic 342 provides promoted prefetched data to dependent micro-operations (i.e., micro-operations that depend on the load micro-operations). In some embodiments, entries 608 in data promotion record 606 are accessed using program counter and speculative virtual address information. In these embodiments, therefore, promotion logic 342 uses program counters and speculative virtual addresses for accessing data promotion record 606 and thereby providing promoted prefetched data to the dependent micro-operations. FIG. 15 presents a timeline diagram illustrating a load-use latency when using promoted prefetched data based on program counters and speculative virtual addresses in accordance with some embodiments. FIG. 15 is presented as a general example of operations performed by some embodiments. Some embodiments, however, perform different operations or perform the operations in a different order. In addition, although a number of functional block labels, i.e., rename, scheduler, etc., are shown in order to provide an illustration of functional blocks in core 300 (i.e., rename unit 330, schedulers 324-328, etc.) in which operations may occur, in some embodiments, different functional blocks perform the operations.

For the example in FIG. 15, time, and thus the timeline, runs from left to right. Also, for the example in FIG. 15, it is assumed that certain prefetched data was earlier/previously promoted to a promotion register. For example, in some embodiments, the prefetched data is promoted using operations such as those shown in FIGS. 6-7. In addition, for the example in FIG. 15, it is assumed that a data promotion record 606 is accessed using program counter and virtual address information such as the embodiment shown in FIG. 9.

Prior to the operations shown in FIG. 15, fetch/decode unit 318 fetches a macro-instruction from L1 instruction cache 320 and decodes the macro-instruction into a load micro-operation (and possibly other micro-operations). Generally, the load micro-operation, when executed in load/store unit 310, causes load/store unit 310 to load data from L1 data cache 312 to a physical register 404. Fetch/decode unit 318 forwards the load micro-operation to dispatch 322.

Before the load micro-operation dispatched from dispatch 322, a virtual address prediction functional block (not shown) in fetch/decode unit 318 or another functional block (e.g., promotion logic 342, etc.) receives information that is to be used for predicting a speculative virtual address. For example, in some embodiments, the virtual address prediction functional block receives, from program counter 344 or another functional block, a program counter associated with the above-described macro-instruction. The virtual address prediction functional block then uses the received information to predict the speculative virtual address. Continuing the example, in some embodiments, the virtual address prediction functional block (or another functional block) keeps a record in which program counters for load micro-operations are associated with virtual addresses—e.g., virtual addresses that were previously computed for the load micro-operations. The virtual address prediction functional block can therefore perform a lookup in the record for a virtual address that is associated with the program counter. When the speculative virtual address is ready, the virtual address prediction functional block provides the speculative virtual address to promotion logic 342 (PROM LOG) and possibly other functional blocks.

Promotion logic 342 then uses the speculative virtual address in an attempt to provide promoted prefetched data to dependent micro-operations (i.e., micro-operations that depend on the load micro-operation). For this operation, promotion logic 342 acquires, from fetch/decode unit 318 or another functional block, the program counter. Promotion logic 342 then uses the program counter and the speculative virtual address to perform a lookup in data promotion record 606 to determine whether the load micro-operation loads data from a portion of a cache block from which data was previously promoted into a promotion register 602. For example, promotion logic 342 may generate a tag or index based the program counter and/or the speculative virtual address (or respective portions thereof) and then use the tag or index to search entries in data promotion record 606 for a matching entry. For the example in FIG. 15, it is assumed that promotion entry 610 in data promotion record 606 includes a record of such promoted prefetched data—i.e., promoted prefetched data 604.

Promotion logic 342 then provides promoted prefetched data 604 to the dependent micro-operations. This operation includes communicating with rename unit 330 to obtain a mapping between a destination architectural register of the load micro-operation and a physical register that is allocated by the rename unit 330 for use as the load micro-operation's destination register. The promotion logic 342 uses this destination physical register identifier to broadcast the promoted prefetched data 604 to the dependent micro-operations. Promoted prefetched data 604 is obtained by reading register file 308 using the physical register identifier provided by promotion logic 342 for the respective promotion register 602, thereby directing the load micro-operation—and eventually the dependent micro-operations—to the respective promotion register 602.

As can be seen in FIG. 15 by the difference in time between the original load-use latency (as described above for FIG. 1) and the reduced load-use latency, by using promoted prefetched data, these embodiments can significantly decrease the load-use latency. In some embodiments, the reduced load-use latency is near zero cycles of a controlling clock—and is multiple cycles of a controlling clock shorter than the original load-use latency. In other words, existing processors (or processor cores) that execute load micro-operations using operations akin to those shown in FIG. 1 can take multiple cycles of a controlling clock longer to commence execution of dependent micro-operations than core 300, which can use promoted prefetched data to more quickly commence execution of dependent micro-operations. In addition, the speculative virtual address can be available sooner than the corresponding computed/actual virtual address. The data promotion record lookup and providing promoted prefetched data can therefore occur sooner in embodiments that use program counters and speculative virtual addresses than in embodiments in which program counters and computed/actual virtual addresses are used (such as the embodiments that are shown in FIG. 14). The reduced load-use latency in embodiments that use program counters and speculative virtual addresses is consequently shorter than the reduced load-use latency in embodiments that use program counters and computed/actual virtual addresses.

As described above, in some embodiments, the operations for preparing the load micro-operation for execution and executing the load micro-operation are continued while promotion logic 342 provides promoted prefetched data 604 to the dependent micro-operations. These operations are continued in order to ensure that the promoted prefetched data 604 provided to the dependent micro-operations is correct and that the load micro-operation is processed in core 300 so that the architectural state of core 300 is kept current. In the event that the promoted prefetched data 604 provided to the dependent micro-operations is incorrect, core 300 performs corrective operations such as flushing micro-operations that began processing subsequent to the load micro-operation and replaying/re-executing the load micro-operation and the subsequent micro-operations.

As can be seen in FIG. 15, the operations for preparing the load micro-operation for execution include dispatch 322 dispatching the load micro-operation to rename unit 330, as shown via the label DISPATCH. Rename unit 330 then assigns physical registers 404 to be used in place of the architectural registers identified in the load micro-operation. Recall that promotion logic 342 has already assigned the promoted prefetched data 604 to a promotion register 602 in register file 308. Because promoted prefetched data 604 is already present in the promotion register 602, register file 308 (or another functional block) immediately broadcasts promoted prefetched data 604 to reservation stations 334-338. Note that the physical register identifier used in the broadcast is the one assigned by rename unit 330 to the destination architectural register for the load micro-operation. Rename unit 330 then forwards the load micro-operation to a scheduler functional block (scheduler 324 for the example in FIG. 15) to be finally prepared for execution. Picker logic in scheduler 324 next issues the load micro-operation to an address generation unit 306 to compute a virtual address from which the load micro-operation is to load data, as shown via the label PICK (VA GEN). The picker logic then translates the virtual address into a physical address (via a translation lookaside buffer lookup or a page table search), as shown via the label PICK (PA GEN). The picker logic next forwards the load micro-operation with the physical address to load/store unit 310 for execution. Executing the load micro-operation causes load/store unit 310 to acquire the data at the physical address from L1 data cache 312 (the data is assumed to be present in L1 data cache 312). Load/store unit 310 then stores the acquired data in the destination physical register 404 for the load micro-operation as shown via the label DATA LOADED. The load/store unit 310 then performs one or more consistency checks to ensure that the load micro-operation did not violate memory ordering rules, as shown via the label CONSISTENCY CHECKS (it is assumed that the load micro-operation did not violate any memory ordering rules). Load/store unit 310 next forwards the completed load micro-operation to retire unit 340 where the load micro-operation is eventually retired, as shown via the label RETIRE.

In some embodiments, after program counter 344 provides the actual/computed virtual address for the load micro-operation, promotion logic 342 (and/or another functional block) performs checks to ensure a match between the speculative virtual address and the actual virtual address. This operation is performed to ensure that the predicted speculative virtual address matches the virtual address that is used for the load micro-operation. In some of these embodiments, promotion logic 342 retains the speculative virtual address so that this check can be performed. In the event that a mismatch is found between the speculative virtual address and the actual virtual address, promotion logic 342 performs corrective operations such as causing core 300 to flush micro-operations that began processing subsequent to the load micro-operation and replaying/re-executing the load micro-operation and the subsequent micro-operations.

In some embodiments, promotion logic 342 (and/or another functional block) performs checks to ensure a match between promoted prefetched data 604 and the data loaded by the micro-operation. This operation is performed to ensure that the dependent micro-operations that were supplied with promoted prefetched data 604 did not use incorrect data. In these embodiments, in the event that a mismatch is found between promoted prefetched data 604 and the data loaded by the micro-operation, promotion logic 342 performs corrective operations such as causing core 300 to flush micro-operations that began processing subsequent to the load micro-operation and replaying/re-executing the load micro-operation and the subsequent micro-operations.

Note that, in contrast to what is shown in FIG. 15, when there is no promoted prefetched data available for a load micro-operation, the data promotion record lookup fails and the load micro-operation is executed to acquire the data to be provided to micro-operations that depend on a load micro-operation. In other words, when there is no promoted prefetched data in a promotion register 602 to be provided to micro-operations that depend on the load micro-operation, core 300 executes the load micro-operation to load data to a physical register 404 and provide the data to the dependent micro-operations.

Discarding Promoted Prefetched Data

Figure 16:
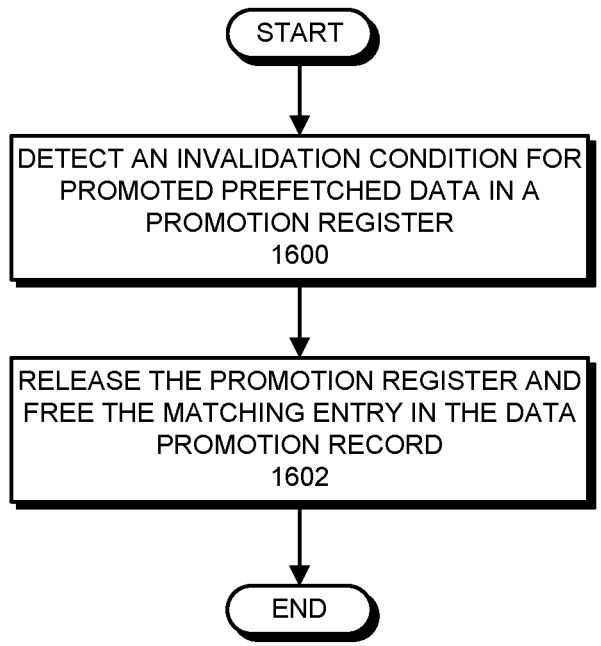
FIG. 16 presents a flowchart illustrating a process for discarding promoted prefetched data from a promotion register in accordance with some embodiments.

In the described embodiments, promotion logic 342 discards promoted prefetched data when specified events occur. Generally, for this operation, promotion logic 342 "discards" promoted prefetched data by removing (i.e., deleting, invalidating, etc.) promoted prefetched data (e.g., promoted prefetched data 604) from a promotion register 602 and clearing a corresponding entry 608 in the data promotion record 606 when an event occurs that renders the promoted prefetched data unsafe, incorrect, and/or inefficient to supply to dependent micro-operations. Once discarded, therefore, promoted prefetched data is no longer available to be provided to dependent micro-operations. FIG. 16 presents a flowchart illustrating a process for discarding promoted prefetched data from a promotion register in accordance with some embodiments. FIG. 16 is presented as a general example of operations performed by some embodiments. Some embodiments, however, perform different operations or perform the operations in a different order. In addition, although certain functional blocks are described as performing the operations in FIG. 16, in some embodiments, different functional blocks perform the operations.

For the example in FIG. 16, it is assumed that prefetched data was earlier/previously promoted to a promotion register, e.g., promoted prefetched data 604. For example, in some embodiments, the prefetched data is promoted using operations such as those shown in FIGS. 6-7.

The operations in FIG. 16 start when promotion logic 342 detects the occurrence of an invalidation condition for promoted prefetched data in a promotion register (step 1600). Generally, for this operation, promotion logic 342, via monitoring its own operation or that of one or more other functional blocks, receiving communications from or about other functional blocks, etc., determines that a specified invalidation condition has occurred. In some embodiments, the invalidation conditions include one or more conditions that directly or indirectly indicate that the promoted prefetched data is—or is likely—no longer safe, correct, and/or efficient to use. Some invalidation conditions are described in the following paragraphs.

In some embodiments, an invalidation condition is that prefetched data from which promoted prefetched data is presently stored in a promotion register is evicted from a cache block in L1 data cache 312. For example, the prefetched data can be evicted to free up the cache block for storing incoming data, can be evicted due to external coherency probes, etc. In these embodiments, the promotion logic 342 can monitor evictions via snooping a cache communications, can receive communications that identify cache blocks from which data is being evicted from L1 data cache 312, etc.

In some embodiments, an invalidation condition is that prefetched data has been stored for more than a threshold (e.g., programmed) period of time in a promotion register without being accessed (has become "stale"). In these embodiments, promotion logic 342 can keep a record of times for which promoted prefetched data is stored in a promotion register 602. For example, promotion logic 342 can include a timestamp in each entry in data promotion record 606 (e.g., in metadata for the entry) that is periodically compared to a current time to determine whether promoted prefetched data has been accessed within a specified time. In these embodiments, upon access of the promoted prefetched data, the corresponding entry in the data promotion record is removed (e.g., as in step 1110), so that the accessed entries will not run afoul of the invalidation condition based on the threshold time. Note that this invalidation condition can occur for incorrectly prefetched (and then promoted) data, i.e., data that is prefetched based on an incorrect prediction made by prefetcher 316 of data to be accessed.

In some embodiments, an invalidation condition is that a demand load hits on the portion of the cache block. In this case, a demand load micro-operation is executed that hits on an entry 608 in the data promotion record 606. Promotion logic 342 therefore monitors demand loads to detect this invalidation condition. In addition to invalidating the data promotion record 606, the register file 308 is updated with the promotion register at the location specified by the physical register identifier assigned to the destination register of the load micro-operation by the rename unit 330.

In some embodiments, functional blocks other than promotion logic 342 include information that is used, or used to assist with, detecting invalidation conditions. For example, in some embodiments, cache blocks in L1 data cache 312 include promoted bits in metadata for the cache blocks that promotion logic 342 sets to indicate when prefetched data from a corresponding cache block has been promoted. In these embodiments, L1 data cache 312 can detect when a cache block from which prefetched data was promoted is evicted using the corresponding promoted bit—and communicate information about an invalidation condition to promotion logic 342. The use of the information in the other functional blocks can help to avoid load (e.g., repeated lookups, etc.) on promotion logic 342, data promotion record 606, and other such functional blocks.

Upon detecting an invalidation condition for promoted prefetched data in a promotion register, promotion logic 342 releases the promotion register and frees the matching entry 608 in data promotion record 606 (step 1602). For this operation, promotion logic 342 deletes the prefetched data 604 from the respective promotion register and/or marks the respective promotion register as invalid/available (e.g., via metadata) to enable the storage of other data in the promotion register. Promotion logic 342 also marks promotion entry 610 as available for storing information about subsequently promoted prefetched data (e.g., sets an invalid or available bit in metadata for promotion entry 610).

In some embodiments, at least one electronic device (e.g., electronic device 200) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 200, processors 202-204, promotion logic 342, or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device including a processor, the processor comprising:
a cache memory;
a plurality of physical registers; and
a promotion logic functional block, the promotion logic functional block configured to:
promote prefetched data from a portion of a cache block in the cache memory to a given physical register, the promoting including storing the prefetched data in the given physical register; and
upon encountering a load micro-operation that loads data from the portion of the cache block into a destination physical register, set the processor so that the prefetched data stored in the given physical register is provided to micro-operations that depend on the load micro-operation.

2. The electronic device of claim 1, wherein:
when promoting the prefetched data, the promotion logic functional block is configured to update an entry in a data promotion record to indicate that the prefetched data is stored in the given physical register; and
when setting the processor, the promotion logic functional block is configured to check the entry in the data promotion record and determine that the prefetched data is stored in the given physical register.

3. The electronic device of claim 2, wherein:
updating the entry in the data promotion record includes updating the entry using a virtual address associated with the prefetched data; and
checking the entry in the data promotion record includes using an actual or speculative virtual address associated with the load micro-operation to check the entry in the data promotion record.

4. The electronic device of claim 2, wherein:
updating the entry in the data promotion record includes updating the entry using a virtual address and a program counter associated with the prefetched data; and
checking the entry in the data promotion record includes using an actual or speculative virtual address and a program counter associated with the load micro-operation to check the entry in the data promotion record.

5. The electronic device of claim 2, wherein the promotion logic functional block is further configured to:

after setting the processor, remove the indication that the prefetched data is stored in the given physical register from the entry in the data promotion record and releasing the given physical register.

6. The electronic device of claim 2, wherein the promotion logic functional block is further configured to:
upon encountering an invalidation condition for the prefetched data in the cache block,
release the given physical register to which the prefetched data was promoted; and
remove the indication that the prefetched data is stored in the given physical register from the entry in the data promotion record.

7. The electronic device of claim 1, wherein:
the processor further comprises a reservation station that holds micro-operations awaiting execution; and
setting the processor includes forwarding the prefetched data stored in the given physical register to the reservation station so that the reservation station can use the prefetched data for micro-operations that depend on the load micro-operation.

8. The electronic device of claim 7, wherein:
setting the processor includes moving the prefetched data from the given physical register to a destination physical register for the load micro-operation.

9. The electronic device of claim 7, wherein:
the processor further comprises a renaming unit that remaps architectural registers identified in micro-operations to physical registers; and
setting the processor includes using the physical register assigned by the renaming unit as the destination architectural register of the load micro-operation as the physical register when forwarding the prefetched data to the reservation station.

10. The electronic device of claim 1, wherein the promotion logic functional block is further configured to:
monitor, over a period of time, portions of cache blocks in the cache memory from which data is loaded into physical registers;
keep, in entries in a data loading record, information about the data and the portions of the cache blocks; and
when promoting prefetched data from the portion of the cache block in the cache memory into the given physical register, use the data loading record to identify the portion of the cache block in the cache memory from which the prefetched data is to be promoted.

11. The electronic device of claim 1, wherein the promotion logic functional block is further configured to:
before promoting the prefetched data from the portion of the cache block into the given physical register, ensure that promotion conditions are met, wherein the promotion logic functional block skips promoting the prefetched data when the promotion conditions are not met, and wherein the promotion conditions include:
a physical register is available for promoting the prefetched data; and
a data loading record that includes identifiers for portions of cache blocks that were previously loaded to physical registers includes a record for the cache block with an identifier of the portion of the cache block.

12. The electronic device of claim 11, wherein the promotion conditions further include one or more conditions associated with an effectiveness of promoting the prefetched data.

13. The electronic device of claim 1, wherein the processor further comprises:

a prefetch logic functional block configured to:
determine that the prefetched data is to be prefetched and stored in a cache block in the cache memory; and
fetch the prefetched data from a lower level cache memory or a memory subsystem in the electronic device and store the prefetched data in the cache block.

14. A method for providing data to micro-operations in an electronic device that includes a processor including a cache memory, a plurality of physical registers, and a promotion logic functional block, the method comprising:
promoting, by the promotion logic functional block, prefetched data from a portion of a cache block in the cache memory to a given physical register, the promoting including storing the prefetched data in the given physical register; and
upon encountering a load micro-operation that loads data from the portion of the cache block into a destination physical register, setting, by the promotion logic functional block, the processor so that the prefetched data stored in the given physical register is provided to micro-operations that depend on the load micro-operation.

15. The method of claim 14, further comprising:
when promoting the prefetched data, updating, by the promotion logic functional block, an entry in a data promotion record to indicate that the prefetched data is stored in the given physical register; and
when setting the processor, checking, by the promotion logic functional block, the entry in the data promotion record and determine that the prefetched data is stored in the given physical register.

16. The method of claim 15, wherein:
updating the entry in the data promotion record includes updating the entry using a virtual address associated with the prefetched data; and
checking the entry in the data promotion record includes using an actual or speculative virtual address associated with the load micro-operation to check the entry in the data promotion record.

17. The method of claim 15, wherein:
updating the entry in the data promotion includes updating the entry using a virtual address and a program counter associated with the prefetched data; and
checking the entry in the data promotion record includes using an actual or speculative virtual address and a program counter associated with the load micro-operation to check the entry in the data promotion record.

18. The method of claim 15, further comprising:
after setting the processor, removing, by the promotion logic functional block, the indication that the prefetched data is stored in the given physical register from the entry in the data promotion record and releasing the given physical register.

19. The method of claim 15, further comprising:
upon encountering an invalidation condition for the prefetched data in the cache block,
releasing, by the promotion logic functional block, the given physical register to which the prefetched data was promoted; and
removing, by the promotion logic functional block, the indication that the prefetched data is stored in the given physical register from the entry in the data promotion record.

20. The method of claim 14, wherein:
the processor includes a reservation station that holds micro-operations awaiting execution; and setting the processor includes forwarding, by the promotion logic functional block, the prefetched data stored in the given physical register to the reservation station so that the reservation station can use the prefetched data for micro-operations that depend on the load micro-operation.

21. The method of claim 20, wherein:
setting the processor includes moving, by the promotion logic functional block, the prefetched data from the given physical register to a destination physical register assigned to the load micro-operation by the renaming unit.

22. The method of claim 20, wherein:
the processor includes a renaming unit that remaps architectural registers identified in micro-operations to physical registers; and
setting the processor includes using the physical register assigned by the renaming unit as the destination architectural register of the load micro-operation as the physical register when forwarding the prefetched data to the reservation station.

23. The method of claim 14, further comprising:
monitoring, by the promotion logic functional block, over a period of time, portions of cache blocks in the cache memory from which data is loaded into physical registers;
keeping, by the promotion logic functional block, in entries in a data loading record, information about the data and the portions of the cache blocks; and
when promoting prefetched data from the portion of the cache block in the cache memory into the given physical register, using, by the promotion logic functional block, the data loading record to identify the portion of the cache block in the cache memory from which the prefetched data is to be promoted.

24. The method of claim 14, further comprising:
before promoting the prefetched data from the portion of the cache block into the given physical register, ensuring, by the promotion logic functional block, that promotion conditions are met, wherein the promotion logic functional block skips promoting the prefetched data when the promotion conditions are not met, and wherein the promotion conditions include:
 a physical register is available for promoting the prefetched data; and
 a data loading record that includes identifiers for portions of cache blocks that were previously loaded to physical registers includes a record for the cache block with an identifier of the portion of the cache block.

25. The method of claim 24, wherein the promotion conditions further include one or more conditions associated with an effectiveness of promoting the prefetched data.

26. The method of claim 14, wherein:
the processor includes a prefetcher functional block; and
the method further comprises:
 determining, by the prefetcher functional block, that the prefetched data is to be prefetched and stored in a cache block in the cache memory; and
 fetching, by prefetcher functional block, the prefetched data from a lower level cache memory or a memory subsystem in the electronic device and storing the prefetched data in the cache block.

* * * * *